(12) United States Patent
Yang et al.

(10) Patent No.: US 9,998,709 B2
(45) Date of Patent: *Jun. 12, 2018

(54) SERVICE ORCHESTRATION TO SUPPORT A CLOUD-BASED, MULTI-PARTY VIDEO CONFERENCING SERVICE IN A VIRTUAL OVERLAY NETWORK ENVIRONMENT

(71) Applicant: AT&T Intellectual Property I, L.P., Atlanta, GA (US)

(72) Inventors: Chen-Yui Yang, Marboro, NJ (US); David H. Lu, Irving, TX (US); Gabriel Bourge, N. Aurora, IL (US); Xidong Wu, San Ramon, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/483,011

(22) Filed: Apr. 10, 2017

(65) Prior Publication Data

US 2017/0374318 A1  Dec. 28, 2017

Related U.S. Application Data

(63) Continuation of application No. 15/194,789, filed on Jun. 28, 2016, now Pat. No. 9,621,853.

(51) Int. Cl.
*H04N 7/14* (2006.01)
*H04N 7/15* (2006.01)
(Continued)

(52) U.S. Cl.
CPC ............. *H04N 7/15* (2013.01); *H04L 65/403* (2013.01); *H04L 65/80* (2013.01); *H04L 67/10* (2013.01)

(58) Field of Classification Search
CPC ....................................................... H04N 7/14
(Continued)

(56) References Cited

U.S. PATENT DOCUMENTS 8,869,236 B1  10/2014  Tonogai
8,914,837 B2  12/2014  Ahmed
(Continued)

FOREIGN PATENT DOCUMENTS

WO  WO 2015/171030  11/2015

OTHER PUBLICATIONS

Ayadi et al., "Adaptive provisioning of Connectivity-as-a-Service for Mobile Cloud Computing," 2014 $2^{nd}$ IEEE International Conference on Mobile Cloud Computing, Services, and Engineering, Apr. 7-10, 2014, IEEE.
(Continued)

*Primary Examiner* — Olisa Anwah
(74) *Attorney, Agent, or Firm* — Hartman & Citrin LLC

(57) ABSTRACT

Concepts and technologies disclosed herein are directed to service orchestration to support cloud-based, multi-party video conferencing service in a virtual overlay network environment. According to one aspect of the concepts and technologies disclosed herein, a video conferencing service orchestrator can receive, from a user device, a service request for the cloud-based, multi-party video conferencing service orchestrated by the video conferencing service orchestrator. In response to the service request, the video conferencing service orchestrator can provide, to the user device, virtual network layer system software and a virtual machine container for installation on the user device. The virtual network layer system software can implement a network function to provide an interface between the user device and a service controller during a video conference. A conference image particular to the type of video conference
(Continued)

can be installed on the virtual machine container to implement the video conference for the user device.

13 Claims, 26 Drawing Sheets

(51) Int. Cl.
*H04L 29/06* (2006.01)
*H04L 29/08* (2006.01)

(58) Field of Classification Search
USPC .................. 348/14.01, 14.08, 14.12, 14.11
See application file for complete search history.

(56) References Cited

U.S. PATENT DOCUMENTS

| | | | |
|---|---|---|---|
| 8,947,497 B2* | 2/2015 | Hines | H04M 3/567 348/14.08 |
| 8,976,716 B2 | 3/2015 | Zhou | |
| 8,990,305 B2 | 3/2015 | Barkley et al. | |
| 9,232,191 B2 | 1/2016 | Periyannan et al. | |
| 2007/0230361 A1* | 10/2007 | Choudhury | H04L 29/06027 370/250 |
| 2010/0085417 A1* | 4/2010 | Satyanarayanan | H04L 12/1822 348/14.08 |
| 2010/0103822 A1* | 4/2010 | Montwill | H04L 41/0645 370/242 |
| 2012/0254858 A1 | 10/2012 | Moyers et al. | |
| 2013/0106989 A1 | 5/2013 | Gage | |
| 2013/0215215 A1 | 8/2013 | Gage et al. | |
| 2014/0108506 A1 | 4/2014 | Borzycki et al. | |
| 2014/0149570 A1 | 5/2014 | Berger | |
| 2014/0160941 A1* | 6/2014 | Hui | H04W 24/10 370/241 |
| 2014/0196137 A1 | 7/2014 | Schwebke | |
| 2014/0225981 A1 | 8/2014 | Chen | |
| 2014/0267569 A1 | 9/2014 | Periyannan et al. | |
| 2014/0280595 A1 | 9/2014 | Mani et al. | |
| 2014/0280932 A1 | 9/2014 | Braun | |
| 2014/0324975 A1 | 10/2014 | Tamura | |
| 2014/0344378 A1 | 11/2014 | Charkraborti et al. | |
| 2015/0106526 A1 | 4/2015 | Arndt | |
| 2015/0150105 A1 | 5/2015 | Takegawa | |
| 2015/0195745 A1 | 7/2015 | Farmanbar et al. | |
| 2015/0288925 A1 | 10/2015 | Hwang et al. | |
| 2015/0358472 A1 | 12/2015 | Rosenberg | |
| 2016/0006574 A1 | 1/2016 | Fahlgren et al. | |
| 2016/0112894 A1* | 4/2016 | Lau | H04W 24/10 370/252 |
| 2016/0173820 A1 | 6/2016 | Ding | |
| 2017/0126476 A1* | 5/2017 | Curtin | H04L 41/0631 |

OTHER PUBLICATIONS

Yamada et al., "A Platform for Converged, Feature-based Real-time Communications," 2015 18th International Conference on Intelligence in Next Generation Networks, Feb. 17-19, 2015, IEEE.
U.S. Notice of Allowance dated Nov. 30, 2016 in U.S. Appl. No. 15/194,789.
Yuan, Feng et al., "Airlift: Video conferencing as a cloud service using inter-datacenter networks," 2012 20th IEEE International Conference on Network Protocols (ICNP), Oct. 30-Nov. 2, 2012.
Panzieri, Fabio et al., "Distributed Computing in the 21st Century: Some Aspects of Cloud Computing," Network and Parallel Computing, 2011, pp. 393-412.
Ebejer, Jean-Paul et al., "The emerging role of cloud computing in molecular modelling," Journal of Molecular Graphics and Modelling, Jul. 2013, vol. 44, pp. 177-187.
International Search Report and Written Opinion dated Jul. 3, 2017 in International Application No. PCT/US2017/026759.

* cited by examiner

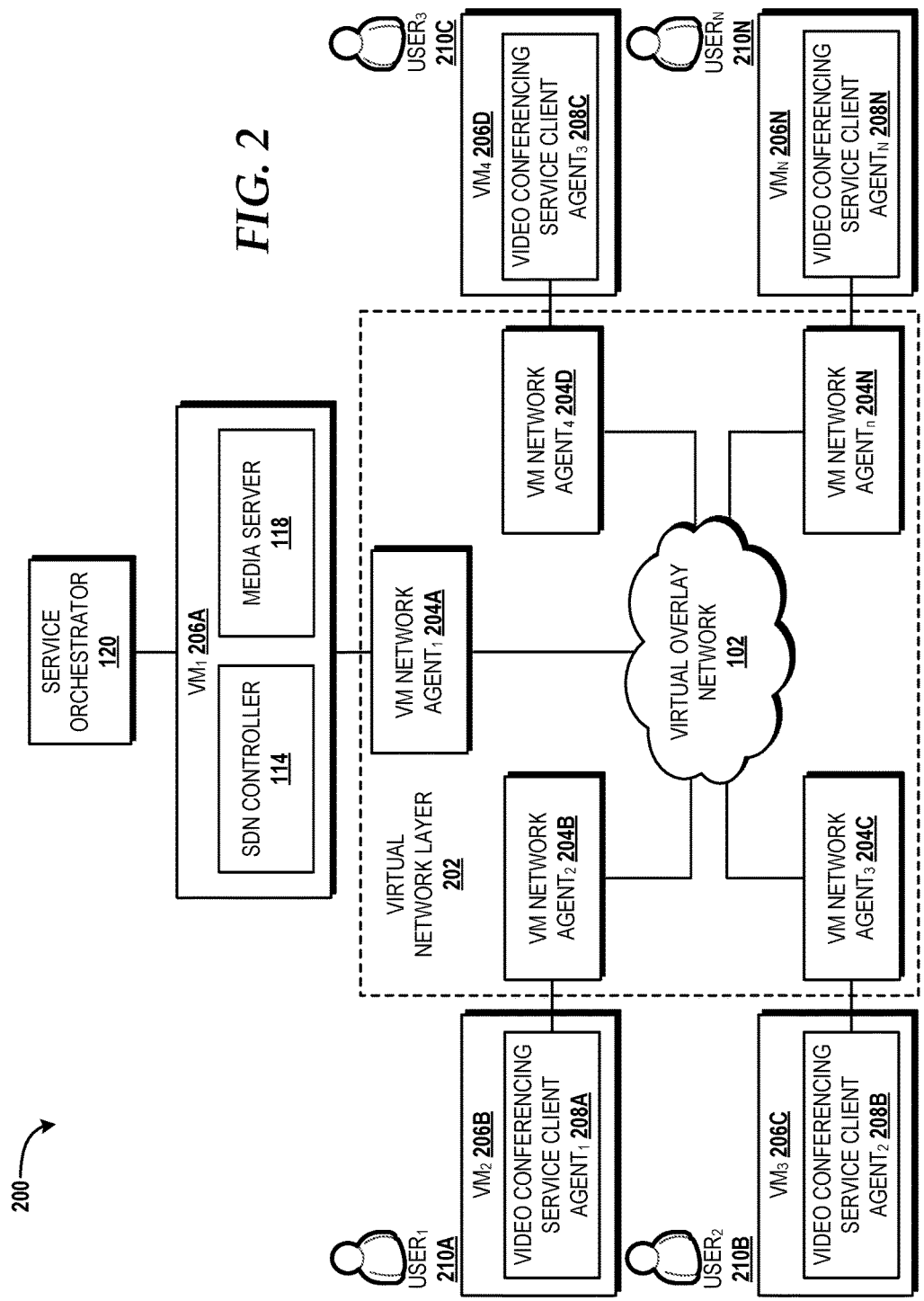

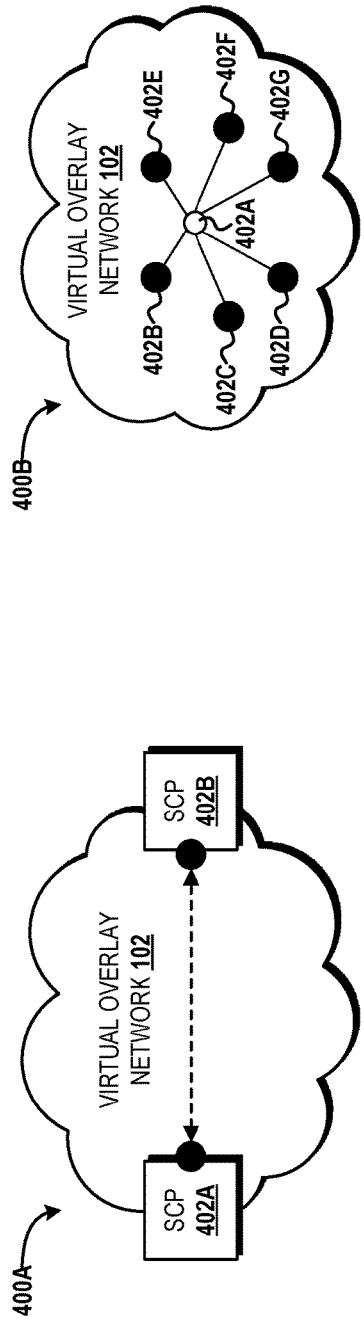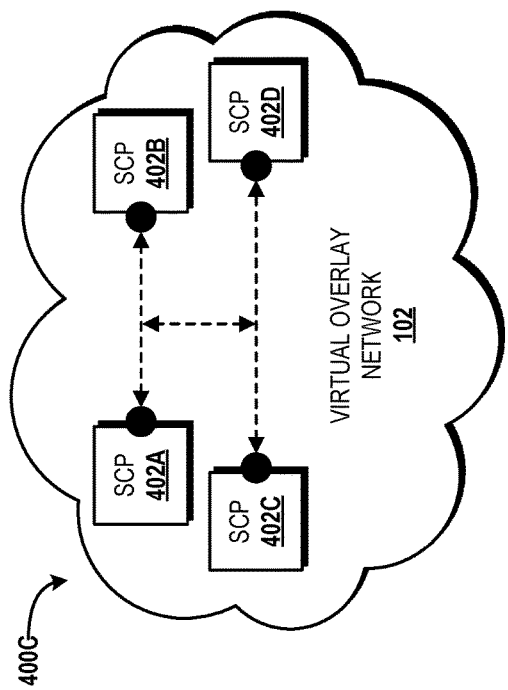
FIG. 4A
FIG. 4B
FIG. 4C

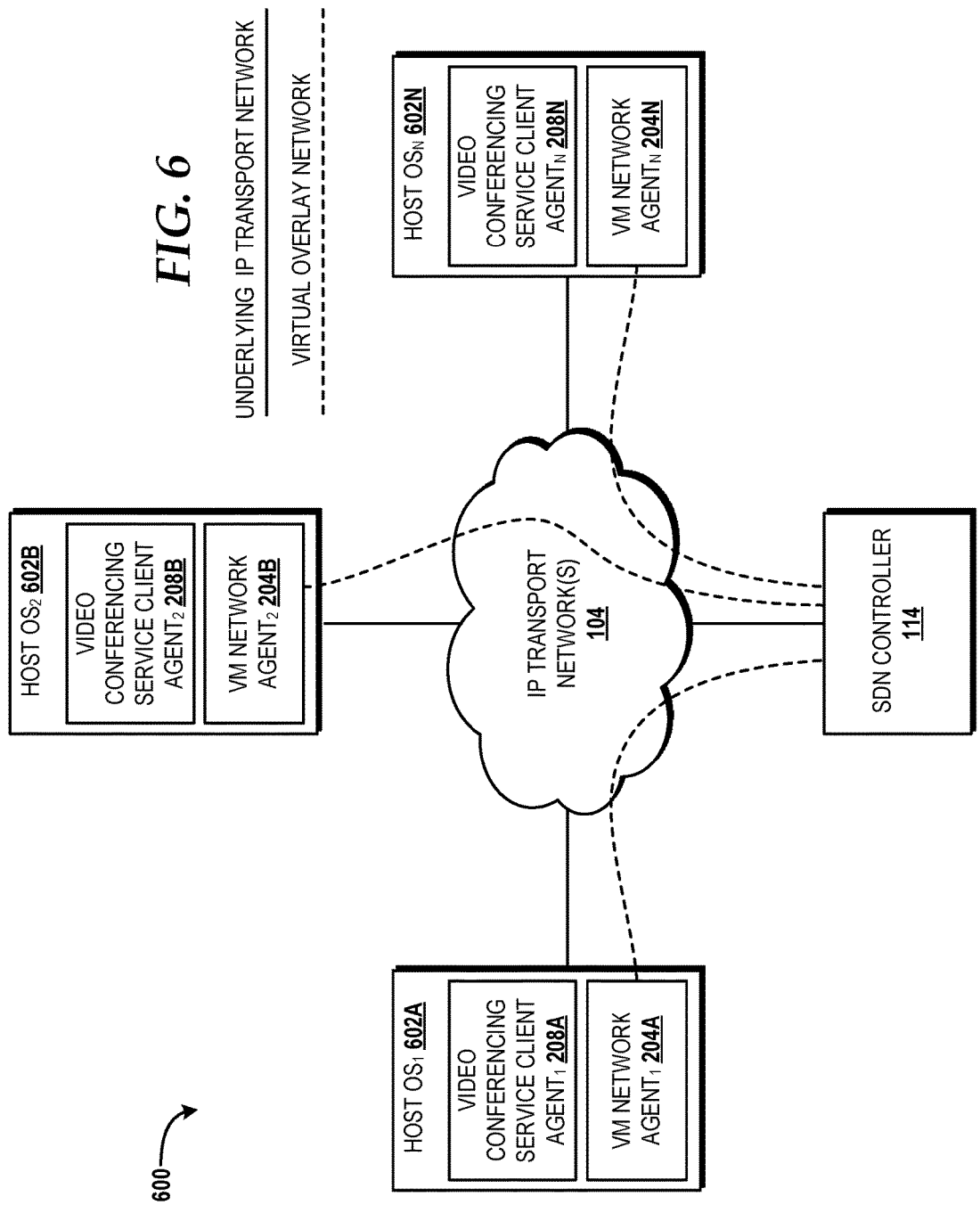

SERVICE ORCHESTRATION TO SUPPORT A CLOUD-BASED, MULTI-PARTY VIDEO CONFERENCING SERVICE IN A VIRTUAL OVERLAY NETWORK ENVIRONMENT

CROSS-REFERENCE TO RELATED APPLICATIONS

This application is a continuation of and claims priority to U.S. patent application Ser. No. 15/194,789, entitled "Service Orchestration to Support a Cloud-Based, Multi-Party Video Conferencing Service in a Virtual Overlay Network Environment," filed Jun. 28, 2016, now U.S. Pat. No. 9,621,853, which is incorporated herein by reference in its entirety.

BACKGROUND

Today, cloud-based, multi-party video conferencing services are a new, emerging technology that requires a global reach and flexibility, scalability, and reliability with high-bandwidth, low-latency connections to provide high-quality video experiences. The capabilities of cloud-based multi-party video conferencing services need to provide on-demand service orchestration, flexibility of managing virtualized cloud networks, scaling network capacity, reliability of maintaining end-user performance expectation, and proactively monitoring network conditions to provide high-end video quality experience for users.

SUMMARY

Concepts and technologies disclosed herein are directed to service orchestration to support a cloud-based, multi-party video conferencing service in a virtual overlay network environment. According to one aspect of the concepts and technologies disclosed herein, a video conferencing service orchestrator can receive, from a user device, a service request for the cloud-based, multi-party video conferencing service orchestrated by the video conferencing service orchestrator. In response to the service request, the video conferencing service orchestrator can provide, to the user device, virtual network layer system software and a virtual machine container for installation on the user device. The virtual network layer system software can implement a network function to provide an interface between the user device and a service controller during a video conference. A conference image can be installed on the virtual machine container to implement the video conference for the user device.

In some embodiments, the video conferencing service orchestrator can receive, from the user device, a service request. The service request can identify a video conference type for the video conference. The video conferencing service orchestrator also can determine that the service controller is a closest service controller capable of serving the user device for the video conference. The service controller can be one of a plurality of service controllers available for selection by the video conferencing service orchestrator to service the user device for the video conference. The video conferencing service orchestrator also can forward the service request to the service controller. The service controller can provide, to the user device, the conference image associated with the video conference type.

In some embodiments, the video conference type is a 1-1 video conference type. In this conference type there are two participants. Both participants can be speakers and listeners during the video conference.

In some embodiments, the video conference type is a 1-N video conference type. In this conference type there are 1+N participants. One participant can be the speaker and N participants can be listeners.

In some embodiments, the video conference type is an N-N video conference type. In this conference type there N participants. Each of the N participants can be speakers and listeners during the video conference.

In some embodiments, the video conferencing service orchestrator can receive, from the user device, a stream request. The stream request can indicate a stream type for media associated with the video conference to be streamed to the user device via a media server controlled by the service controller. The stream type can be a single media stream or a combined media stream. The single media stream can contain media associated with one participant. The combined media stream can contain media associated with multiple participants. The media server can be implemented as part of the service controller or separate from the service controller.

In some embodiments, the video conferencing service orchestrator can receive a quality of experience ("QoE") measurement in an alert/alarm from the service controller. The QoE measurement is a measure of a customer's experiences. The QoE alert/alarm indicates change of a quality of service ("QoS"). QoS measures hardware and software performance resulting in a poor service for the video conference no longer being in accordance with the overall level of customer satisfaction. The auto-correlation based upon network QoS condition(s) and video QoE indicator(s) can determine a root cause of the degradation of service. The optimization policy will be performed to improve the service quality for the video conference. The optimization policy can include performing QoS re-assignment, performing a bandwidth upgrade, performing performance tuning and/or configuration changes, and/or reducing video conferencing demand.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 2 is a block diagram illustrating a cloud-based video conferencing service deployment in a virtual overlay network, according to an illustrative embodiment.

FIGS. 4A-4C are block diagrams illustrating various configurations of media servers deployed within in a cloud environment for different video conferencing service types, according to illustrative embodiments.

FIG. 6 is a block diagram illustrating an illustrative service controller implementation capable of implementing aspects of the concept and technologies disclosed herein.

DETAILED DESCRIPTION

Figure 1A:
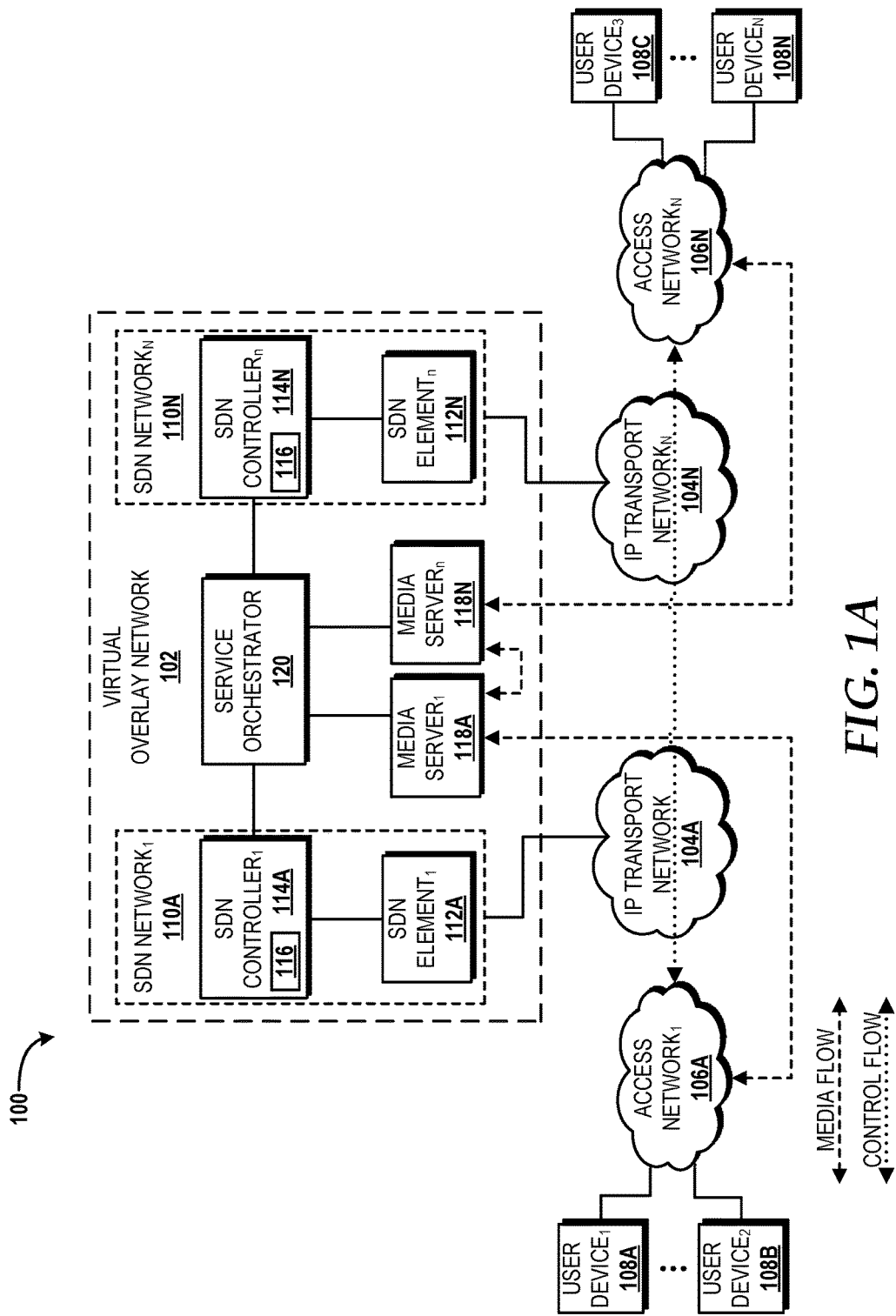
FIGS. 1A-1B are block diagrams illustrating an illustrative network operating environment capable of implementing aspects of the concepts and technologies disclosed herein for service orchestration to support a cloud-based, multi-party video conferencing service over the web, according to an illustrative embodiment.

Multi-party video conferencing services are part of a multi-trillion dollar industry in the telecommunications world. The concepts and technologies disclosed herein provide cloud-based capabilities to make audio/video conference calls more web and smartphone friendly. Unlike over-the-top video conferencing services, the concepts and technologies disclosed herein can deliver the same high-end video conference experiences with high definition video and audio quality, but under the umbrella of a reliable and secure operator network infrastructure. This will result in customer adoption of the disclosed solution and will create a larger calling circle for current subscribers due to the flexible range of communication options provided by network operators. Implementation of the concepts and technologies disclosed herein by service providers, equipment vendors, and software integration vendors will allow these entities to gain a competitive advantage, both from an emerging service product point of view as well as delivering best in class service for multi-party video conferencing.

The concepts and technologies described herein provide an innovative and automated approach to dynamically change media server configurations and to support performance optimization management, including real-time traffic optimization and adaptive media quality policy in a virtual overlay network environment. The concepts and technologies disclosed herein provide high-end video conference experiences to users, resulting in generating new revenue for service providers. Moreover, the concepts and technologies disclosed herein address challenges in on-demand service orchestration, flexibility of managing virtualization-optimized cloud networks, scalability of efficiently using network capacity, reliability of maintaining end user performance expectations, and proactively monitoring network QoS condition and video quality experience.

The concepts and technologies disclosed herein provide a new video conferencing service orchestration platform and advanced methodologies to support dynamic configuration design of virtual machine ("VM") media server clusters, cloud-based solutions including multicast routing, hardware configuration, network topology, and their associated bandwidth requirements in a virtual overlay network environment. The concepts and technologies disclosed herein provide robust service orchestration management to create, control, and facilitate multiple simultaneous live video conferencing meetings based upon service types, attributes, and parameters. A pre-configured and pre-tested a service template can be utilized for building and configuring service instances. The concepts and technologies disclosed herein also provide methodology of dynamic change of media server configuration based on user utilization patterns. The concepts and technologies disclosed herein also provide methodology of on-demand site selection of service controller/media server based upon real-time traffic optimization policy. The concepts and technologies disclosed herein also provide a methodology of adaptive performance management of video conference stream quality based upon QoE and QoS optimization policy. The concepts and technologies disclosed herein also provide a methodology of initiating QoE alerts/alarms based upon media quality of video conference client-side.

The concepts and technologies disclosed herein provide several benefits to service providers. In particular, the concepts and technologies disclosed herein can increase customer retention due to higher customer satisfaction and enhanced communications service, increase revenue based upon increased customer lifetime value, and facilitate deployment of new software controllers on existing platforms and migrate network functions to a cloud environment.

The concepts and technologies disclosed herein also provide several benefits to customers. In particular, the concepts and technologies disclosed herein can enhance communications experience at relatively low costs, provide easy-to-use video calling service that encourages quality communications with friends/family, and to provide innovative software clients developed by original equipment manufacturers and developer community that use the soft phone platform. Cloud-based video conference service for high-quality video experiences has not yet been defined in the industry. For this reason, all video conference call service providers, VM cloud service providers, equipment vendors, and telecommunications service providers can benefit from the concepts and technologies disclosed herein.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, mobile devices, wireless devices, multiprocessor systems, distributed computing systems, microprocessor-based or programmable consumer electronics, minicomputers, mainframe computers, routers, switches, other computing devices described herein, and the like.

In the following detailed description, references are made to the accompanying drawings that form a part hereof, and in which are shown by way of illustration specific embodiments or examples. Referring now to the drawings, in which like numerals represent like elements throughout the several figures, aspects of concepts and technologies for service orchestration to support a cloud-based, multi-party video conferencing service in a virtual overlay network environment will be described.

Figure 1B:
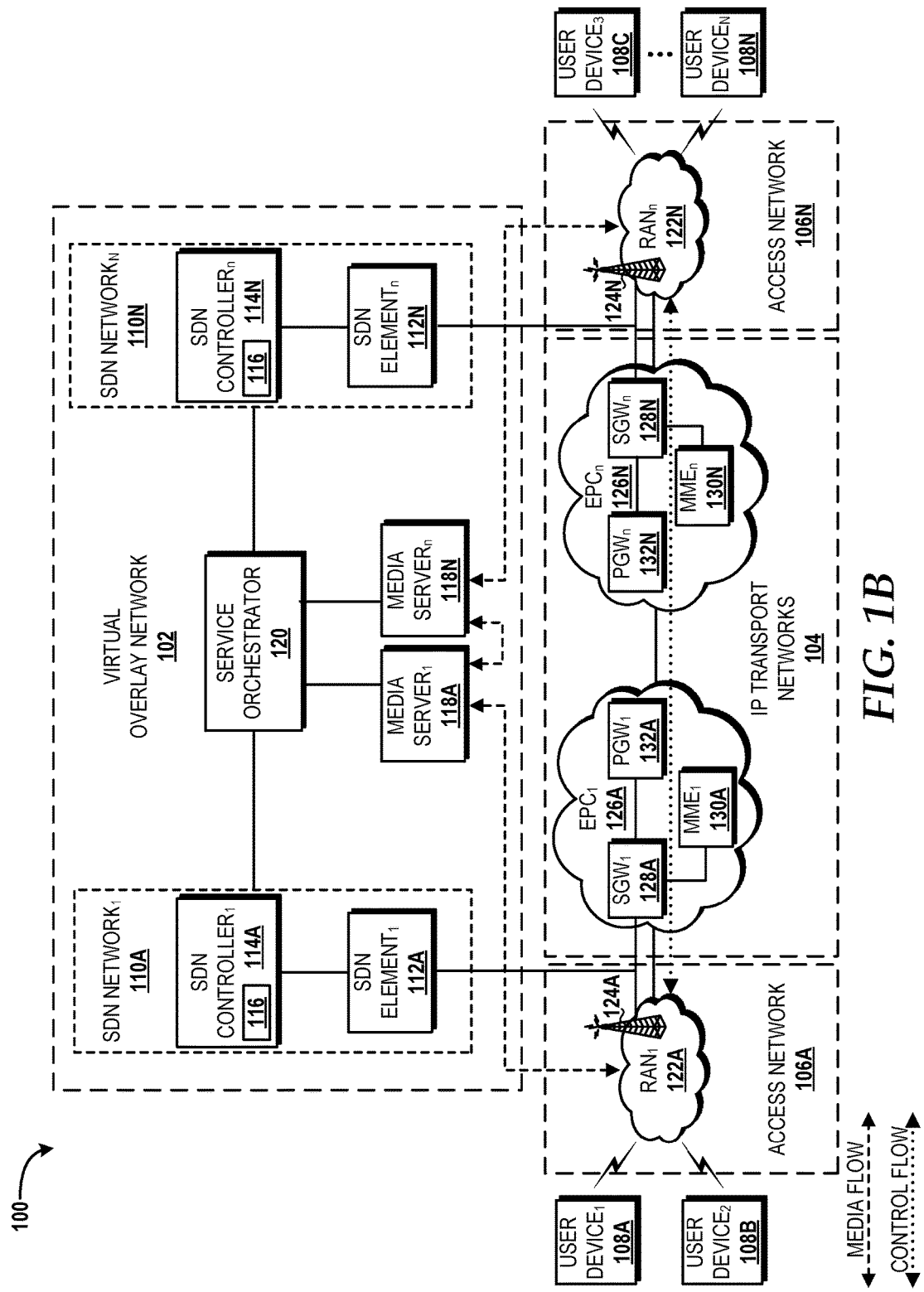

Turning now to FIGS. 1A and 1B, an illustrative network operating environment 100 in which aspects of the concepts and technologies disclosed herein for service orchestration to support a cloud-based, multi-party video conferencing service (hereinafter "video conferencing service") over the web can be implemented will be described, according to an embodiment. FIG. 1A illustrates the network operating environment 100 that includes a virtual overlay network 102 that utilizes, at least in part, software-defined networking ("SDN") concepts to support aspects of the video conferencing service described herein. In particular, the virtual overlay network 102 facilitates dynamic configuration design of VM media server clusters, and cloud-based solutions including multicast routing, hardware configuration, network topology, and associated bandwidth requirements. Moreover, the virtual overlay network 102 provides robust service orchestration management to create, control, and facilitate multiple simultaneous live video conferencing meetings based upon service types, attributes, and parameters. A pre-configured and pre-tested service template can be used for building and configuring instances of the video conferencing service. The virtual overlay network 102 facilitates a methodology for dynamically changing media server configurations based upon user utilization patterns. The virtual overlay network 102 also facilitates a methodology for on-demand site selection of service controller/media server based upon real-time traffic optimization policy. The virtual overlay network 102 also facilitates methodology for adaptive performance management of video conference stream quality based upon QoE and QoS optimization policy. The virtual overlay network 102 also facilitates methodology for initiating QoE alerts/alarms based upon media quality of video conferences client-side.

The illustrated virtual overlay network 102 is in communication with internet protocol ("IP") transport networks 104A, 104N (referred to herein collectively as IP transport networks 104, or in the singular form as IP transport network 104), which, in turn, are in communication with one or more access networks 106A, 106N (referred to herein collectively as access networks 106, or in the singular form as access network 106) that serve one or more user devices 108A-108N (referred to herein collectively as user devices 108, or in the singular form as user device 108).

The IP transport networks 104 can include any wireless/mobile IP network capable of transporting IP data transfer associated with one or more instances of the video conferencing service described herein. The IP transport networks 104 can include one or more wireless core networks, such as, for example, an evolved packet core ("EPC") a circuit-switched core network ("CS CN"), a packet-switched core network ("PS CN"), an IP multimedia subsystem ("IMS") core network, multiples thereof, and/or combinations thereof. A wireless core network can utilize one or more mobile telecommunications technologies, such as, but not limited to, Global System for Mobile communications ("GSM"), Code Division Multiple Access ("CDMA") ONE, CDMA2000, Universal Mobile Telecommunications System ("UMTS"), Long-Term Evolution ("LTE"), Worldwide Interoperability for Microwave Access ("WiMAX"), other 802.XX technologies (e.g., 802.11 WI-FI), and the like. By way of example, and not limitation, the IP transport network 104 can be or can include a Long-Term Evolution ("LTE") mobile wireless network, such as the example LTE mobile wireless network shown in FIG. 1B, which will be described herein below in greater detail. The IP transport networks 104 can additionally or alternatively include one or more wired/fixed IP networks capable of transporting IP data transfer associated with one or more instances of the video conferencing service described herein. It should be understood, however, that the design of the virtual overlay network 102 is agnostic to the underlying IP transport network 104 and, as such, the examples of the IP transport network 104 disclosed herein should not be construed as being limiting in any way.

The access networks 106A, 106N (referred to herein collectively as access networks 106, or in the singular form as access network 106) can include any IP access network that provides IP connectivity to the user devices 108 for access to the IP transport networks 104. Each of the user devices 108 can be a cellular phone, a feature phone, a smartphone, a mobile computing device, a tablet computing device, a portable television, a portable video game console, a user equipment ("UE"), or any other user device that is capable of communicating with the access network(s) 106.

In some embodiments, the access networks 106 can include one or more radio access networks ("RANs") (best shown in FIG. 1B). A RAN can utilize various channel access methods including, but not limited to, Time Division Multiple Access ("TDMA"), Frequency Division Multiple Access ("FDMA"), Single Carrier FDMA ("SC-FDMA"), Code Division Multiple Access ("CDMA"), wideband CDMA ("W-CDMA"), Orthogonal Frequency Division Multiplexing ("OFDM"), Space Division Multiple Access ("SDMA"), and/or the like to provide a radio/air interface to the user devices 108. Data communications can be provided in part by General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and/or various other current and future wireless data access technologies. Moreover, a RAN may be a GSM RAN ("GRAN"), a GSM EDGE RAN ("GERAN"), a UMTS Terrestrial Radio Access Network ("UTRAN"), an E-UTRAN, any combination thereof, and/or the like.

The illustrated network operating environment 100 also includes SDN networks 110A-110N (referred to herein collectively as SDN networks 110, or in the singular form as SDN network 110). The SDN networks 110 provide, at least in part, the virtual overlay network 102. The illustrated SDN networks 110 each include one or more SDN network elements 112A-112N (referred to herein collectively as SDN elements 112, or in the singular form as SDN element 112). The SDN elements 112 can include one or more switches, routers, hubs, repeaters, servers, gateways, other network elements, some combination thereof, and/or the like.

As used herein, "SDN" is an architectural framework for creating intelligent networks that are programmable, application-aware, and more open than traditional networks. In accordance with the concepts and technologies disclosed herein, SDN concepts are utilized to provide the virtual overlay network 102 to support video conferencing services. Since SDN provides an agile and cost-effective communications platform for handling dramatic increases in data traffic on networks by providing a high degree of scalability, security, and flexibility, SDN is ideally-suited as the architectural framework upon which to base the virtual overlay network 102.

SDN allows for the creation of multiple virtual network control planes on common hardware. SDN can help extend service virtualization and software control into many existing network elements. Moreover, SDN enables applications to request and to manipulate services provided by the network and to allow the network to expose network states back to applications. SDN exposes network capabilities through application programming interfaces ("APIs"), making the control of network equipment remotely accessible and modifiable via third-party software clients.

Figure 20:
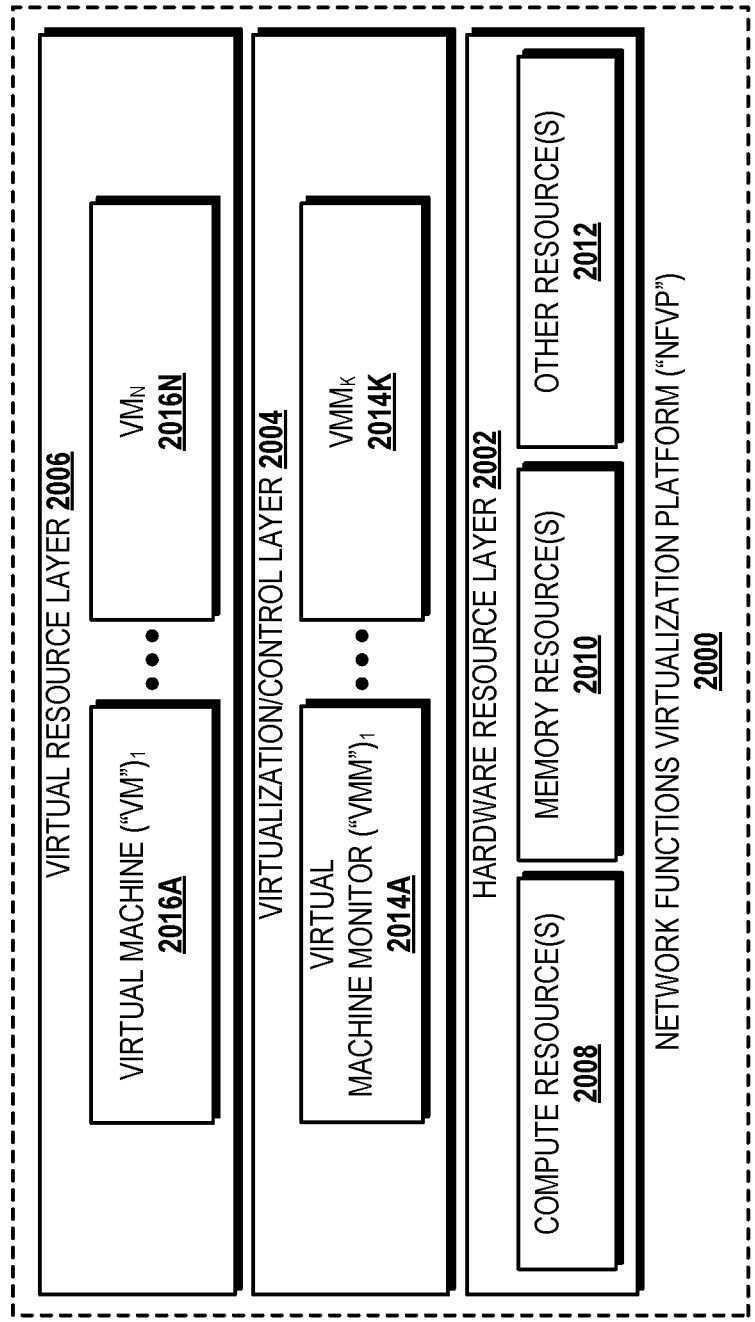
FIG. 20 is a block diagram illustrating an example network functions virtualization platform ("NFVP") and components thereof capable of implementing aspects of the embodiments presented herein.

In some embodiments, at least a portion of the SDN elements 112 are created utilizing a network functions virtualization platform ("NFVP") (best shown in FIG. 20). An NFVP is a shared infrastructure that can support multiple services and network applications, including non-real-time applications and real-time applications, such as the video conferencing service described herein. The NFVP can include a plurality of hardware resources, including, for example, processing/compute resources, memory resources, and other resources such as input/output ("I/O") resources. These resources can be virtualized and managed by one or more virtual machine monitors ("VMMs") (also known as "hypervisors) to manage one or more virtual resources as abstractions of at least a portion of the hardware resources. These abstractions can be referred to as VMs. The VMs can execute one or more real-time applications to provide, at least in part, the video conferencing service described herein.

The illustrated SDN networks 110 each include one or more SDN controllers 114A-114N (referred to herein collectively as SDN controllers 114, or in the singular form as SDN controller 114). The SDN controllers 114 also are referred to herein generally as "service controllers 114"). The SDN controllers 114 can control operations of the SDN elements 112 based upon one or more QoS policies 116. In accordance with the concepts and technologies disclosed herein, the SDN controllers 114 can utilize the QoS policies 116 to dictate the treatment of video conferencing data to ensure a specified QoS is provided for a given video conference session.

In accordance with the concepts and technologies disclosed herein, a mobility media offloading technique can be utilized to ensure that the video conferencing service can provide an optimal shortest path between the user devices 108 and/or one or more media servers 118A-118N (referred to herein collectively as media servers 118, or in the singular form as media server 118). The media servers 118 are designed to receive, store, and share media, such as, for example, audio and video associated with video conferencing sessions.

The media servers 118 can be managed by the SDN controllers 114. Although the media servers 118 are shown, in the illustrated embodiment, as being separate from the SDN controllers 114, the media servers 118 can be combined with the SDN controllers 114 in other embodiments, such as in some of the embodiments disclosed herein below.

The video conferencing service can be orchestrated by a video conferencing service orchestrator ("service orchestrator") 120. The service orchestrator 120 is capable of viewing the entirety of the virtual overlay network 102. The service orchestrator 120 can include a computing system that includes one or more processors. The service orchestrator 120 can receive a service request from a user/customer associated with one of the user devices 108. In response to the service request, the service orchestrator 120 can coordinate instantiation of one or more VMs to process operations disclosed herein for providing the video conferencing service in accordance with a specific type of conference identified in the request. The service orchestrator 120 also can utilize an overview of the virtual overlay network 102 to find and assign one or more of the SDN controllers 114 and one or more of the media servers 118 for servicing a given conference. In accordance with embodiments, the service orchestrator 120 can select the SDN controller(s) 114 and the media server(s) 118 that are closest to the user devices 108 participating in the conference. It is in this manner that the video conferencing service can provide an optimal shortest path between the user device(s) 108 and the media server(s) 118.

Turning now to FIG. 1B, the network operating environment 100 is shown with the virtual overlay network 102, the IP transport networks 104, the access networks 106, the user devices 108, the SDN networks 110, the SDN elements 112, the SDN controllers 114, the policies 116, the media servers 118, and the service orchestrator 120 introduced above in FIG. 1A. In the embodiment illustrated in FIG. 1B, the IP transport networks 104 and the access networks 106 are implemented in accordance with LTE standards. As noted above, the virtual overlay network 102 is agnostic to the underlying IP transport network 104; however, a wireless transport network that can guarantee QoS, such as LTE, is a likely real-world implementation of the IP transport network 104 over which the virtual overlay network 102 operates in accordance with the concepts and technologies disclosed herein.

The illustrated network operating environment 100 includes the user devices 108 operating in communication with one or more radio access networks ("RANs") 122A-

122N (referred to herein collectively as RANs 122, or in the singular form as RAN 122). In the illustrated example, the user device$_1$ 108A and user device$_2$ 108B are in communication with the RAN$_1$ 122A, and the user device$_3$ 108C and the user device$_n$ 108N are in communication with the RAND$_n$ 122N.

The user devices 108 can communicate with the RAN 122 by way of one or more eNodeBs ("eNBs") 124A-124N (referred to herein collectively as eNBs 124, or in the singular form as eNB 124). Although only a single eNB 124 is shown as being part of each of the RANs 122, each of the RANs 122 can support multiple eNBs 124. Each of the RANs 122 can include one or more service areas (also referred to as "cells") having the same or different cell sizes, which may be represented, for example, by different cell-types. As used herein, a "cell" refers to a geographical area that is served by one or more base stations, such as one or more of the eNBs 124, operating within the access network 106, implemented, for example, as one of the RANs 122. The cells within the RANs 122 can include the same or different cell sizes, which may be represented by different cell-types. A cell-type can be associated with certain dimensional characteristics that define the effective radio range of a cell. Cell-types can include, but are not limited to, a macro cell-type, a metro cell-type, a femto cell-type, a pico cell-type, a micro cell-type, wireless local area network ("WLAN") cell-type, and a white space network cell-type. Other cell-types, including proprietary cell-types and temporary cell-types also are contemplated.

Although, in the illustrated example, each of the user devices 108 is shown as being in communication with one RAN 122—that is, the user device$_1$ 108A and the user device$_2$ 108B are in communication only with the RAN$_1$ 122A, and the user device$_3$ 108C and the user device$_n$ 108N are in communication only with the RAN$_n$ 122N—the user devices 108 may be in communication with any number of access networks, including WI-FI access networks (not shown) and/or access networks that incorporate collocated wireless wide area network ("WWAN") WI-FI and cellular technologies (also not shown). Accordingly, the user device 108 can be, in some embodiments, dual-mode devices.

The RANs 122 can operate in accordance with one or more RAT that utilize mobile telecommunications standards, such as those described herein above. By way of example, and not limitation, the RANs 122 are illustrated as Evolved Universal Mobile Telecommunications System Terrestrial RANs ("E-UTRANs") for operating in accordance with Third Generation Partnership Project ("3GPP") specifications for LTE. It should be understood that the RANs 122 can operate in accordance with other RATs, including, but not limited to, GSM, CDMA ONE, CDMA2000, UMTS, WiMAX, other current 3GPP cellular technologies, other future 3GPP cellular technologies, combinations thereof, and/or the like. The RANs 122 can utilize any of the channel access methods (which may or may not be used by the aforementioned standards), including, but not limited to, TDMA, FDMA, CDMA, W-CDMA, OFDM, SC-FDMA, SDMA, and the like to provide a radio/air interface to the user devices 108. Data communications can be provided in part by the RANs 122 using GPRS, EDGE, the HSPA protocol family including HSDPA, EUL or otherwise termed HSUPA, HSPA+, LTE, and/or various other current and future wireless data access technologies. Accordingly, the RANs 122 may be E-UTRANs as illustrated, or other RANs such as, but not limited to, GSM RANs ("GRANs"), a GSM EDGE RANs ("GERANs"), UTRANs, any combination thereof, and/or the like. Moreover, in some embodiments, the RANs 122 can be or can include one or more virtual RANs ("vRANs") provided, at least in part, in accordance with SDN concepts.

Each of the RANs 122 is shown as being in communication with an evolved packet core ("EPC") network 126. In particular, the RAN$_1$ 122A is shown as being in communication with an EPC$_1$ 126A, and the RAN$_n$ 122N is shown as being in communication with an EPC$_n$ 126N (referred to herein collectively as EPCs 126, or in the singular form as EPC 126). The EPC networks 126 provide core network functions in accordance with 3GPP standards specifications. The core network functions provided by each of the EPC networks 126 can include, as in the illustrated example, one or more serving gateways ("SGWs") 128, one or more mobility management entities ("MMEs") 130, and one or more packet data network gateways ("PGWs") 132. In particular, the EPC$_1$ 126A is shown as having an SGW$_1$ 128A, an MME$_1$ 130A, and a PGW$_1$ 132A. Similarly, the EPC$_n$ 126N is shown as having an SGW$_n$ 128N, an MME$_n$ 130N, and a PGW$_n$ 132N. These network elements are well-known, and therefore additional details in this regard are not provided herein.

The mobility media offloading technique described herein allows for bypassing the IP transport networks 104, thereby improving the QoS/QoE provided to end users (i.e., the participants in a video conference). This is accomplished, at least in part, by the deployment of the SDN elements 112, operating as SDN switches, between the access network 106 and the IP transport network 104. In the LTE environment shown in FIG. 1B, the SDN elements 112 are deployed between the eNBs 124 of the RANs 122 and the SGWs 128 of the EPCs 126.

The SDN elements 112 can inspect traffic flowing between the RANs 122 and the EPCs 126 to detect traffic associated with GPRS tunneling protocol ("GTP") tunnel set up specifically for a video conference (referred to as a "setup event"). In response to detecting a setup event, the SDN element 112 can inform its SDN controller 114. The SDN controller 114, in turn, can assign the media server(s) 118 to be utilized to serve media data (e.g., audio and video) for the video conference. Alternatively, the SDN controller 114 can inform the service orchestrator 120 to assign the media server(s) 118 for the video conference.

After the video conferences begins and a media stream begins to flow (shown as "media flow") between the user devices 108 involved in the video conference, the SDN element 112 can de-encapsulate the GTP tunnel and can forward the media data packets to the previously assigned media server 118. The media data packets that are to be sent to another media server (e.g., from the media server 118A to the media server 118N) is demand-based and controlled by the SDN controller 114 or the service orchestrator 120.

Turning now to FIG. 2, a block diagram illustrating a cloud-based video conferencing service deployment 200 in the virtual overlay network 102 will be described, according to an illustrated embodiment. The cloud-based video conferencing service deployment 200 includes the virtual overlay network 102 introduced above in FIGS. 1A, 1B. The virtual overlay network 102 provides a virtual network layer 202 that includes a plurality of VM network agents 204A-204N (referred to herein collectively as VM network agents 204, or in the singular form as VM network agent 204). The VM network agents 204 operate underneath a plurality of VMs 206A-206N (referred to herein collectively as VMs 206, or in the singular form as VM 206). The VM network agents 204 provide communication between the VMs 206 and the virtual network layer 202. The VM network agents 204 provide network address translation between the private VM IP and the hosting server's public IP. The VM network agents 204 can manage the interface for hosting OS IP routing. The VM network agents 204 can manage security (e.g., encryption and decryption). The VM network agents 204 can perform routing and switching with other clients and controllers. The VM network agents 204 can set the correct differentiated services code point ("DSCP") marking.

In particular, a $VM_1$ 206A provides video conferencing controller functionality via the SDN controller 114 and media server functionality via the media server 118; a $VM_2$ 206B includes a video conferencing service client $agent_1$ 208A; the $VM_3$ 206C includes a video conferencing service client $agent_2$ 208B; the $VM_4$ 206D includes a video conferencing service client $agent_3$ 208C; and the $VM_N$ 206N includes a video conferencing service client $agent_n$ 208N. The illustrated cloud-based video conferencing service deployment 200 also includes a plurality of users 210A-210N (referred to herein collectively as users 210, or in the singular form as user 210). Although four users are shown in the illustrated example, it is contemplated that a video conferencing service session (also referred to herein as "video conference") can include no less than two users (also referred to herein as "participants"), but an upper limit for the number of users is not defined herein.

The cloud-based video conferencing service deployment 200 provides several benefits over existing conferencing solutions. Virtual services are easy to maintain and to upgrade over time to accommodate service growth. The virtual overlay network 102 benefits from rapid deployment enabled by SDN technology and can utilize open source virtual networking technologies. All service endpoints in the cloud-based video conferencing service deployment 200 do not need public routable IPs—private IPs suffice. In addition, security can be easily deployed, maintained, and upgraded as necessary for the cloud-based video conferencing service deployment 200.

Specifics regarding the cloud-based video conferencing service deployment 200 will now be described. One of the users 210—the $user_1$ 210A for the remainder of this example—initiates a video conference and causes a service request to be sent to the service orchestrator 120. In the meantime, a VM corresponding to the specific type of conference is booted up—that is, the $VM_1$ 206A in the illustrated example. The service orchestrator 120 then assigns a closest controller, such as the SDN controller 114 in the illustrated example, and a media server, such as the media server 118 in the illustrated example, for servicing the conference. The video conferencing service client $agent_1$ 208A and the SDN controller 114 then establish a dedicated tunnel for controlling the video conferencing service through the appropriate VM network agents 204, which include the VM network $agent_1$ 204A and the VM network $agent_2$ 204B in the illustrated example. The VM network agents 204 can implement any networking function that is required based upon the hosting environment.

For n-1 video services, a tree configuration will be set up between client and media server. For 1-1 video services, controller will request a point-to-point configuration will be built between each two clients based. For n-n services, controller will instruct all involved clients to set up a bridge configuration. Virtual network client (e.g., the VM network agent 204) will be responsible for working with hosting operating system to set correct DSCP) marking based upon service QoS classification.

Figure 3:
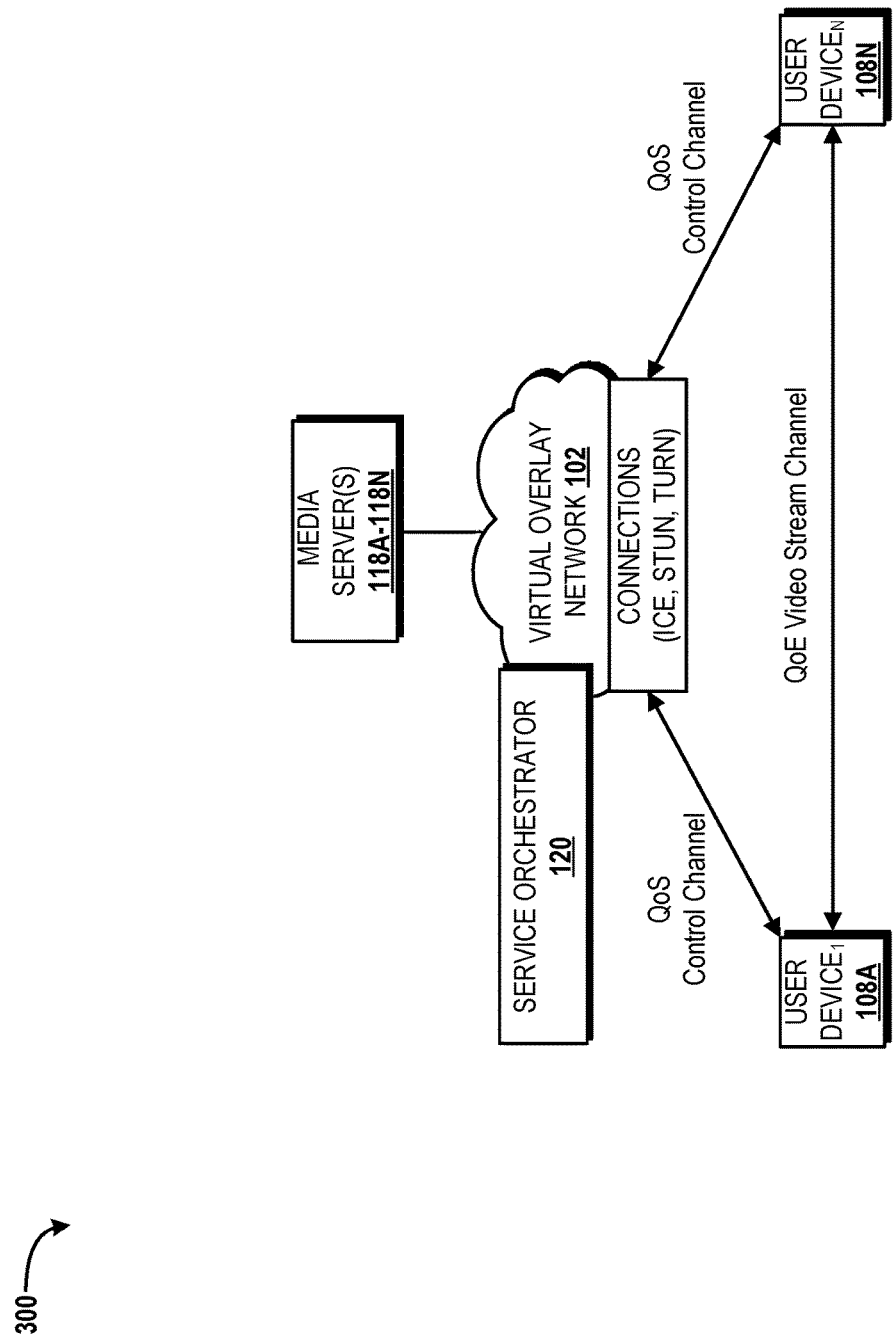
FIG. 3 is a block diagram illustrating an example implementation for serving a high QoE cloud-based video conference call over a virtual overlay network, according to an illustrative embodiment.

Turning now to FIG. 3, an example implementation 300 for serving a high QoE cloud-based video conference call over the virtual overlay network 102 will be described, according to an illustrative embodiment. The illustrated implementation 300 includes the user devices 108A-108N, the virtual overlay network 102, the service orchestrator 120, and the media servers 118A-118N introduced above with reference to FIG. 1A. In the example implementation 300, the media servers 118A-118N can passively capture packets for call setup signaling and media channels. If a call setup packet with session description protocol ("SDP") is captured, the media server 118A, 118N can save the real-time transport control protocol ("RTCP") port and IP information of this call; update or remove such information when receiving relevant updates (e.g., UPDATE, re-INVITE, BYE, CANCEL). If above RTCP traffic is captured, generate alerts/alarms if pre-defined conditions are met.

Turning now to FIGS. 4A-4C, various configurations 400A-400C of media servers deployed within in a cloud environment for different video conferencing service types will be described, according to illustrative embodiments. Each of the configurations 400A-400C includes two or more service control points ("SCPs") 402, embodied as the media servers 118 for implementation of the video conferencing service. Multi-party conferencing networks utilize channels of $2^X$, where X is the number of subscribers. In order to address scalability of capacity $2^X$, three services with difference configurations can be designed in accordance with the exemplary configurations set forth below.

Turning first to FIG. 4A, a basic service configuration 400A is shown for a basic service type. The basic service configuration 400A is one-to-one and utilizes a point-to-point topology type with bandwidth of 2×2 for a total of 4 channels between two SCPs 402A, 402B. In FIG. 4B, a broadcast service configuration 400B is shown for a broadcast service type. The broadcast service configuration 400B is one-to-many and utilizes a tree topology type with bandwidth of 2×X for a total of 2×X channels between the SCP 402A (the broadcasting SCP) and SCPs 402B-402G (the listening SCPs). In FIG. 4C, a multi-party service configuration 400C is shown for a multi-party service type. The multi-party service configuration 400C is many-to-many and utilizes a bridge topology type with bandwidth of 4×X for a total of 4×X channels between the SCPs 402A-402D. In some implementations, such as for distance learning scenarios, a bundle service combining the broadcast service and the multi-party service can be utilized. The VM media server with the capability of service orchestration management can create, control, and facilitate multiple simultaneous live video conferencing meetings based upon service types, attributes, and parameters. A pre-configured and pre-tested a VMS service template can be used for building and configuring. Dynamic configuration design of the media server can be based on user utilization patterns or can be pre-defined by the users.

Figure 5:
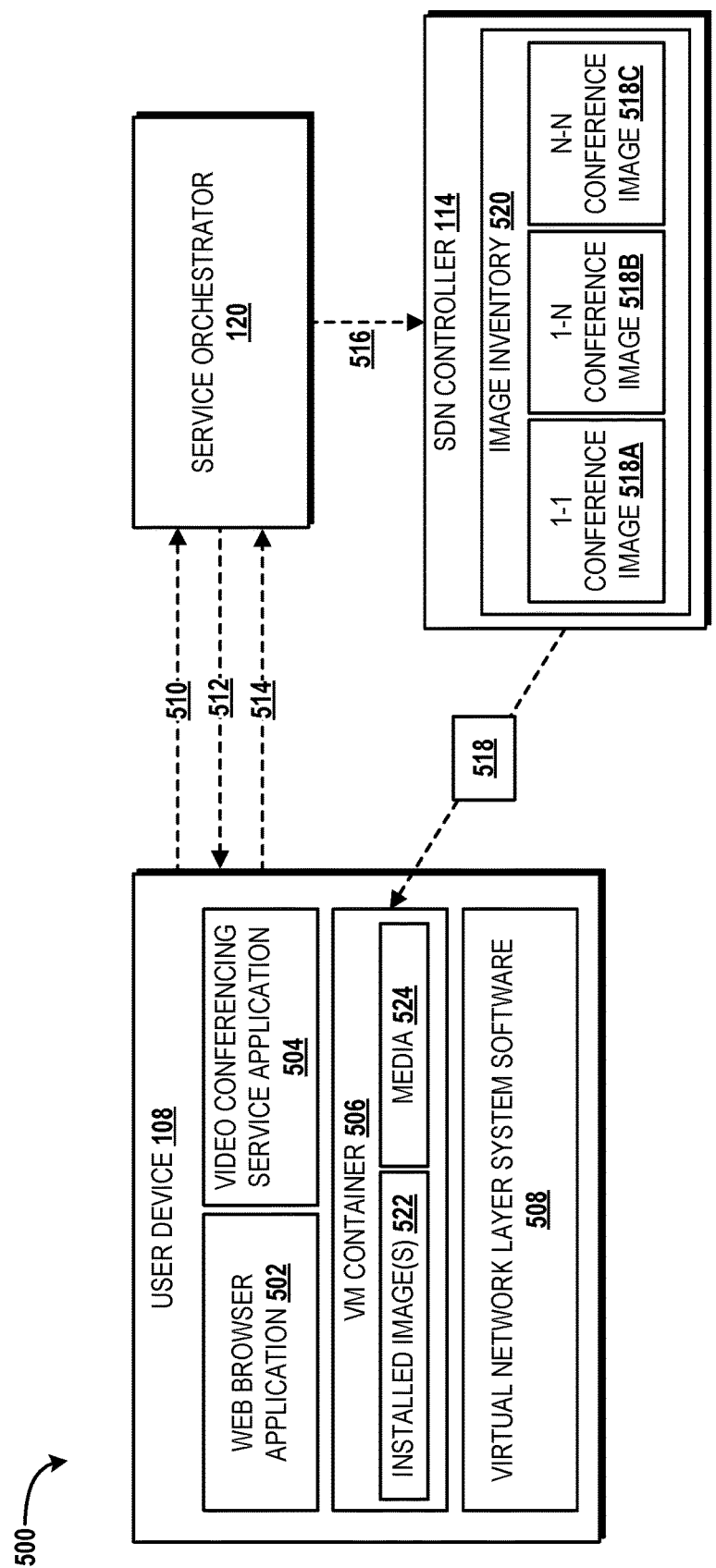
FIG. 5 is a block diagram illustrating an illustrative cloud-based video conferencing orchestration architecture capable of implementing aspects of the concepts and technologies disclosed herein.

Turning now to FIG. 5, a cloud-based video conferencing orchestration architecture 500 will be described, according to an illustrative embodiment. The cloud-based video conferencing orchestration architecture 500 includes the user device 108, the service orchestrator 120, and the SDN controller 114 introduced above in FIGS. 1A and 1B. Although only a single user device 108, a single service orchestrator 120, and a single SDN controller 114 are shown in the illustrated embodiment, other embodiments can include multiples of one or more of these elements.

The illustrated embodiment of the user device 108 includes a web browser application 502, a video conferencing service application 504, a VM container 506, and virtual network layer system software 508. The user device 108 can execute the web browser application 502, the video conferencing service application 504, the VM container 506, and the virtual network layer system software 508 via one or more processing components, such as, for example, the processor best shown in FIG. 19.

The web browser application 502 allows users to access web portals, link pages, web sites, and/or other information available on the World Wide Web. According to embodiments, a user can access the service orchestrator 120 via the web browser application 502. Alternatively, in other embodiments, a user can access the service orchestrator 120 via the video conferencing service application 504. The video conferencing service application 504 can be a native application that is installed on the user device 108 and provides access to the service orchestrator 120. In some embodiments, the video conferencing service application 504 provides access to the same or similar resources as the web browser application 502 via a native interface facilitated, at least in part, by an operating system (best shown in FIG. 19) of the user device 108 instead of a web interface provided via the web browser application 502.

The virtual network layer system software 508 can include the VM network agent 204 introduced in FIG. 2. The virtual network layer system software 508 can implement any networking function that the user device 108 needs based upon the hosting environment. Some example networking functions include, but are not limited to virtual routers, virtual switches and/or other virtual network applications. In case of a LINUX system, for example, a vSwitch interface can be implemented between virtual services and LINUX IP networking.

A user can sign up for the video conferencing service through the web browser application 502 or the video conferencing service application 504. In either case, a customer sign up request (generally shown at 510) can be generated and sent to the video conferencing service orchestrator 120. After the user signs up for the video conferencing service, the service orchestrator 120 provides (generally shown at 512) the virtual network layer system software 508 to the user device 108, and the user device 108 installs the virtual network layer system software 508.

After the virtual network layer system software 508 is installed on the user device 108, a service request (generally shown at 514) can be generated and sent to the service orchestrator 120. The service request can instruct the service orchestrator 120 to set up a specific type of video conference.

The type of video conference can be a 1-1 video conference, wherein the SDN controller 114 creates a point-to-point configuration (best shown in FIG. 4A) between each client participating in the 1-1 video conference. The type of video conference can be a 1-N video conference, wherein the SDN controller 114 creates a tree configuration (best shown in FIG. 4B) between the client participating in the video conference as the speaker and N media servers associated with N clients participating in the video conference as listeners. The type of video conference can be an N-N video conference, wherein the SDN controller 114 instructs all (N) participating clients to set up a bridge configuration (best shown in FIG. 4C) between the N clients participating in the video conference as speakers/listeners (i.e., everyone can speak).

The service orchestrator 120 forwards (generally shown at 516) the service request to the closest service controller, which, in the illustrated example, is the SDN controller 114.

Although only one service controller—the SDN controller 114—is shown in FIG. 5, real-world implementations likely will have multiple service controllers. The service orchestrator 120 can determine which SDN controller 114 is closest to the user device 108 and forward the service request 510 to that SDN controller 114.

The SDN controller 114 receives the service request 516 from the service orchestrator 120 and, in response, selects, from a set of available images 518A-518C in an image inventory 520, an image matching the service identified in the service request. The available images 518A-518C can be a special type of virtual application that is used to create a virtual machine with a cloud deployment. In the illustrated example, the SDN controller 114 can store, in the image inventory 520, a 1-1 conference image 518A, a 1-N conference image 518B, and an N-N conference image 518C, corresponding to the 1-1 video conference service, the 1-N video conference service, and the N-N video conference service, respectively. The SDN controller 114 then provides the appropriate image 518 to the user device 108 for installation in the VM container 506. The image(s) installed in the VM container 506 are illustrated as installed image(s) 522. The user device 108 is then set up for the video conference service(s) provided by the installed image(s) 522. After the setup process described above, the selected video conference service can be instantiated and media 524 (e.g., audio and video) associated with the video conference can be presented via the VM container 506.

Turning now to FIG. 6, a block diagram illustrating a service controller implementation 600 of an illustrative service controller function capable of implementing aspects of the concept and technologies disclosed herein will be described. The illustrated service controller implementation 600 includes a plurality of host operating systems ("host OS") 602A-602N (referred to herein collectively as hosts OSs 602, or in the singular form host OS 602), the VM network agents 204 (see FIG. 2), the video conferencing service client agents 208 (see FIG. 2), and the SDN controller 114.

The VM network agents 204 provide all service functions. The VM network agents 204 are responsible for virtual overlay network traffic routing and forwarding. The VM network agents 204 provide the interface between the virtual overlay network 102 (shown in the illustrated example by the dashed line) in private network address space and the underlying IP transport network(s) 104. The VM network agents 204 are agnostic to the underlying IP transport network(s) 104.

The virtual overlay network 102 uses tunneling (e.g., GPE, IP-SEC, MPLS, and/or the like) built on top of the IP transport network(s) 104. The IP transport IP network(s) 104 provides physical traffic transportation for all control and data traffic. The specific choice of tunneling technology is based upon the type(s) of the underlying IP transport network(s) 104. The SDN controller 114 provides all network and service control functions.

The SDN controller 114 waits for client initial service requests. Upon receiving a service request, the SDN controller 114 initiates an authentication, authorization, and accounting ("AAA") type authentication process with the requesting one of the video conferencing service client agents 208. Once the authentication is finished, the SDN controller 114 instructs the video conferencing service client agent 208 to download the VM image or application for the requested service. The SDN controller 114 is also responsible for dynamic host configuration protocol ("DHCP") for the virtual overlay network 102 and maintaining the network topology. The SDN controller 114 also instructs the video conferencing service client agent 208 to setup and tear down media tunnels between client and media server. When providing 1-N or N-N media service, the SDN controller 114 is responsible for forwarding media to multiple recipients.

Figure 7A:
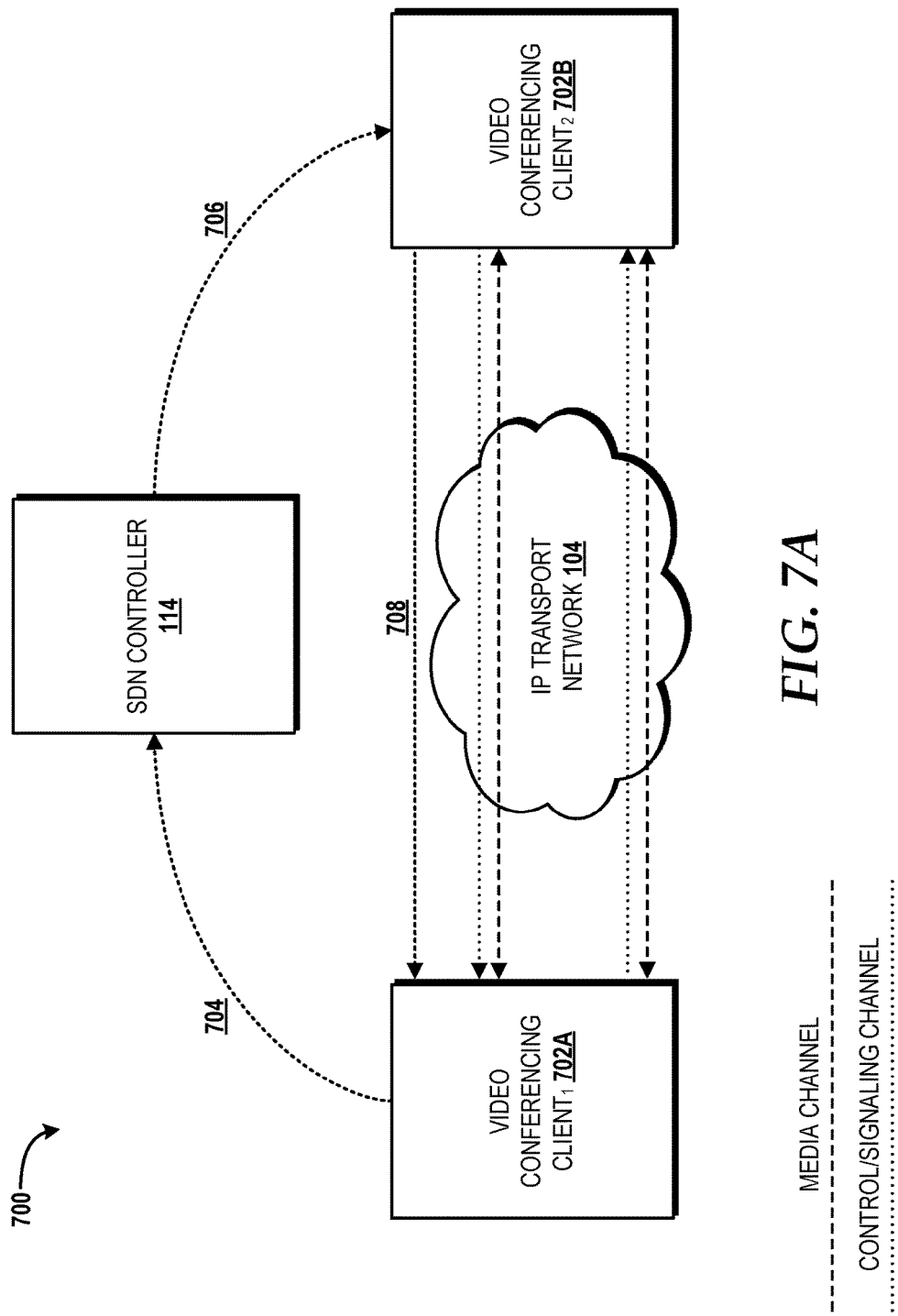
FIGS. 7A-7C are block diagrams illustrating several video conferencing service implementations, according to illustrative embodiments.

Turning now to FIG. 7A, a 1-1 video conferencing service implementation 700 will be described, according to an illustrative embodiment. The 1-1 video conferencing service implementation 700 can utilize the basic service configuration 400A for a basic service type shown in FIG. 4A. The 1-1 video conferencing service implementation 700 includes a first video conferencing client ("video conferencing client$_1$ 702A"), a second video conferencing client ("video conferencing client$_2$ 702B"), the SDN controller 114, and the IP transport network 104. The video conferencing clients 702A, 702B can include the user devices 108 executing the video conferencing service application 504 (shown in FIG. 5).

In the 1-1 video conferencing service implementation 700, the video conferencing client$_1$ 702A serves as the initiating client for a video conference. The video conferencing client$_1$ 702A can send a request (generally shown at 704) to the SDN controller 114 to initiate a 1-1 video conference with another client—that is, the video conferencing client$_2$ 702B in the illustrated example. The SDN controller 114, in turn, can forward the request (generally shown at 706) to the video conferencing client$_2$ 702B. The video conferencing client$_2$ 702B can then initiate communication (generally shown at 708) with the video conferencing client$_1$ 702A. Two media channels and two control channels are then established between the video conferencing clients 702A, 702B. One media channel and one control channel are established for each direction of communication.

Figure 7B:
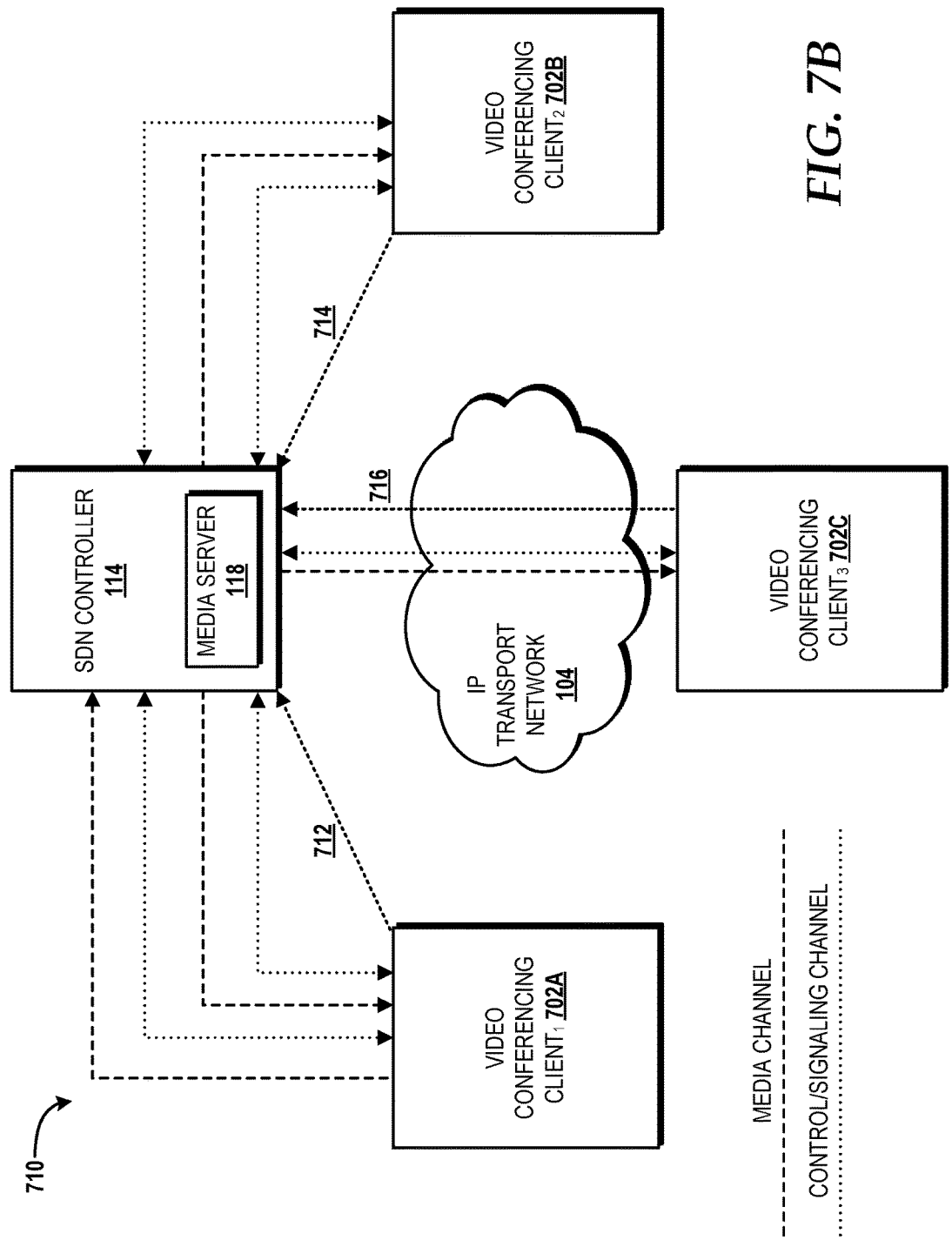

Turning now to FIG. 7B, a 1-N video conferencing service implementation 710 will be described, according to an illustrative embodiment. The 1-N video conferencing service implementation 710 can utilize the broadcast service configuration 400B for a broadcast service type shown in FIG. 4B. The 1-N video conferencing service implementation 710 includes the first video conferencing client ("video conferencing client$_1$ 702A"), the second video conferencing client ("video conferencing client$_2$ 702B"), a third video conferencing client ("video conferencing client$_3$ 702C"), the SDN controller 114, and the IP transport network 104.

In the 1-N video conferencing service implementation 710, the video conferencing client$_1$ 702A serves as the initiating client for a video conference and is associated with the sole speaker in the video conference. The video conferencing client$_2$ 702B and the video conferencing client$_3$ 702C are both associated with listeners in the video conference (i.e., N=2 in the illustrated example). Although only two listeners are illustrated, any number (i.e., N listeners) are contemplated in the 1-N video conferencing service implementation 710. The video conferencing client$_1$ 702A can send a request (generally shown at 712) to the SDN controller 114 to initiate a 1-N video conference with N listeners—the video conferencing client$_2$ 702B and the video conferencing client$_3$ 702C in the illustrated example. The SDN controller 114 authenticates the video conferencing client$_1$ 702A and establishes two media channels and two control channels between the video conferencing client$_1$ 702A and the SDN controller 114 to provide audio and video media associated with the speaker to the media server(s) utilized in the video conference.

The video conferencing client$_2$ 702B and the video conferencing client$_3$ 702C (i.e., the listeners) can then send join conference requests (generally shown at 714 and 716, respectively) to the SDN controller 114. The SDN controller 114, in turn, authenticates the video conferencing client$_2$ 702B and the video conferencing client$_3$ 702C, establishes a media channel and a control channel between the video conferencing client$_2$ 702B and the SDN controller 114, and establishes a media channel and a control channel between the video conferencing client$_3$ 702C and the media server 118 of the SDN controller 114. After media is received from the video conferencing client$_1$ 702A (i.e., the speaker) by the media server 118, the media server 118 then streams the media to the video conferencing client$_2$ 702B and the video conferencing client$_3$ 702C (i.e., the listeners).

Figure 7C:
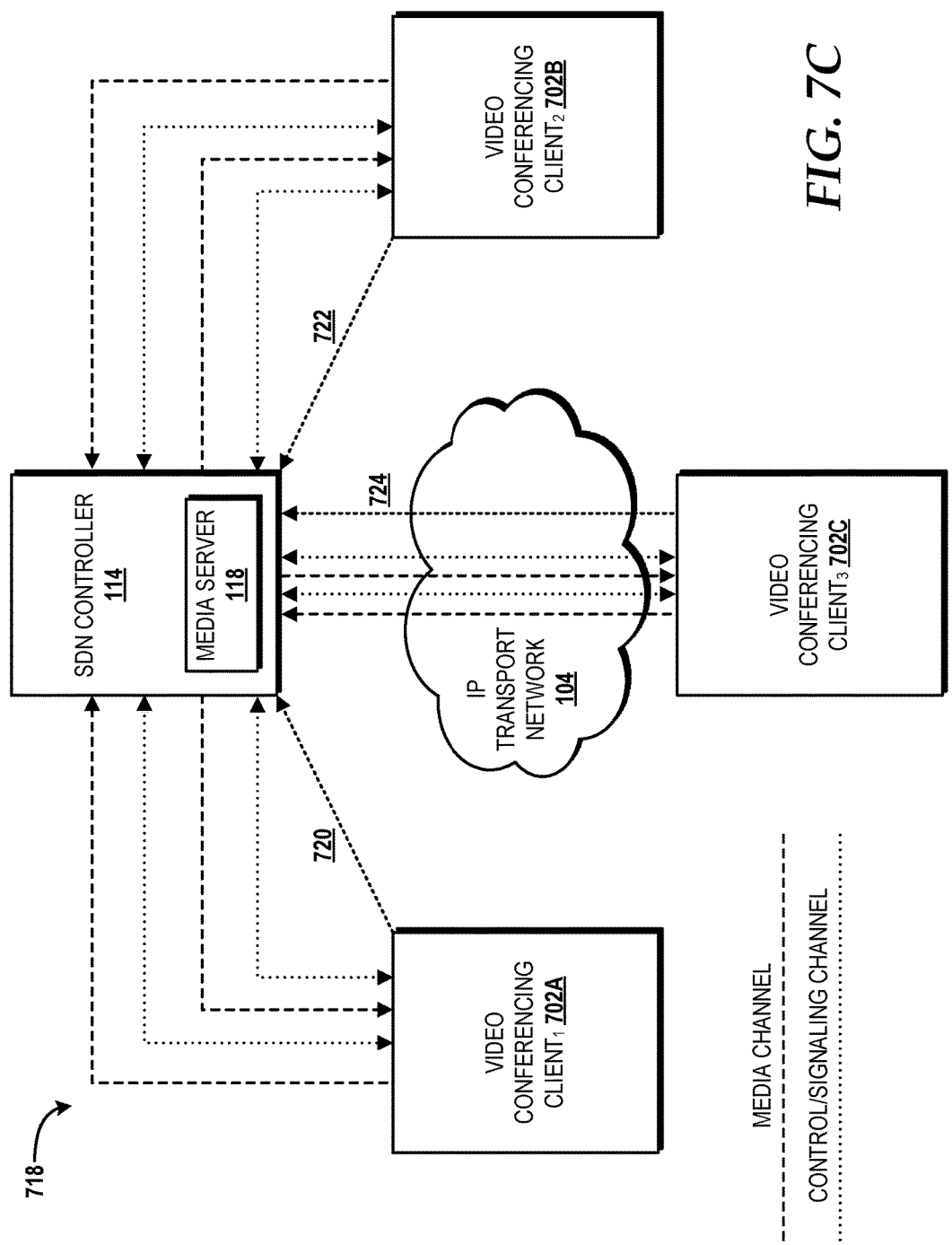

Turning now to FIG. 7C, an N-N video conferencing service implementation 718 will be described, according to an illustrative embodiment. The N-N video conferencing service implementation 718 includes the first video conferencing client ("video conferencing client$_1$ 702A"), the second video conferencing client ("video conferencing client$_2$ 702B"), the third video conferencing client ("video conferencing client$_3$ 702C"), the SDN controller 114, and the IP transport network 104.

In the N-N video conferencing service implementation 718, the video conferencing client$_1$ 702A serves as the initiating client in the video conference. The video conferencing client$_1$ 702A, the video conferencing client$_2$ 702B, and the video conferencing client$_3$ 702C are all speakers. As such, the N-N video conferencing service implementation 718 is similar to the 1-N video conferencing service implementation 710 described above with reference to FIG. 7B except every client requires two media channels and two control channels for downlink and uplink media flow.

The video conferencing client$_1$ 702A can send a request (generally shown at 720) to the SDN controller 114 to initiate an N-N video conference with N listeners and N speakers. The SDN controller 114 authenticates the video conferencing client$_1$ 702A and establishes two media channels and two control channels between the video conferencing client$_1$ 702A and the SDN controller 114 to provide audio and video media associated with the speaker to the media server 118 of the SDN controller 114.

The video conferencing client$_2$ 702B and the video conferencing client$_3$ 702C (i.e., the other speakers/listeners) can then send join conference requests (generally shown at 722 and 724, respectively) to the SDN controller 114. The SDN controller 114, in turn, authenticates the video conferencing client$_2$ 702B and the video conferencing client$_3$ 702C, establishes two media channels and two control channel between the video conferencing client$_2$ 702B and the media server 118 of the SDN controller 114, and establishes two media channels and two control channels between the video conferencing client$_3$ 702C and the media server 118 of the SDN controller 114. After media is received from a speaker by the media server 118, the media server 118 streams the media to all listeners.

Figure 8:
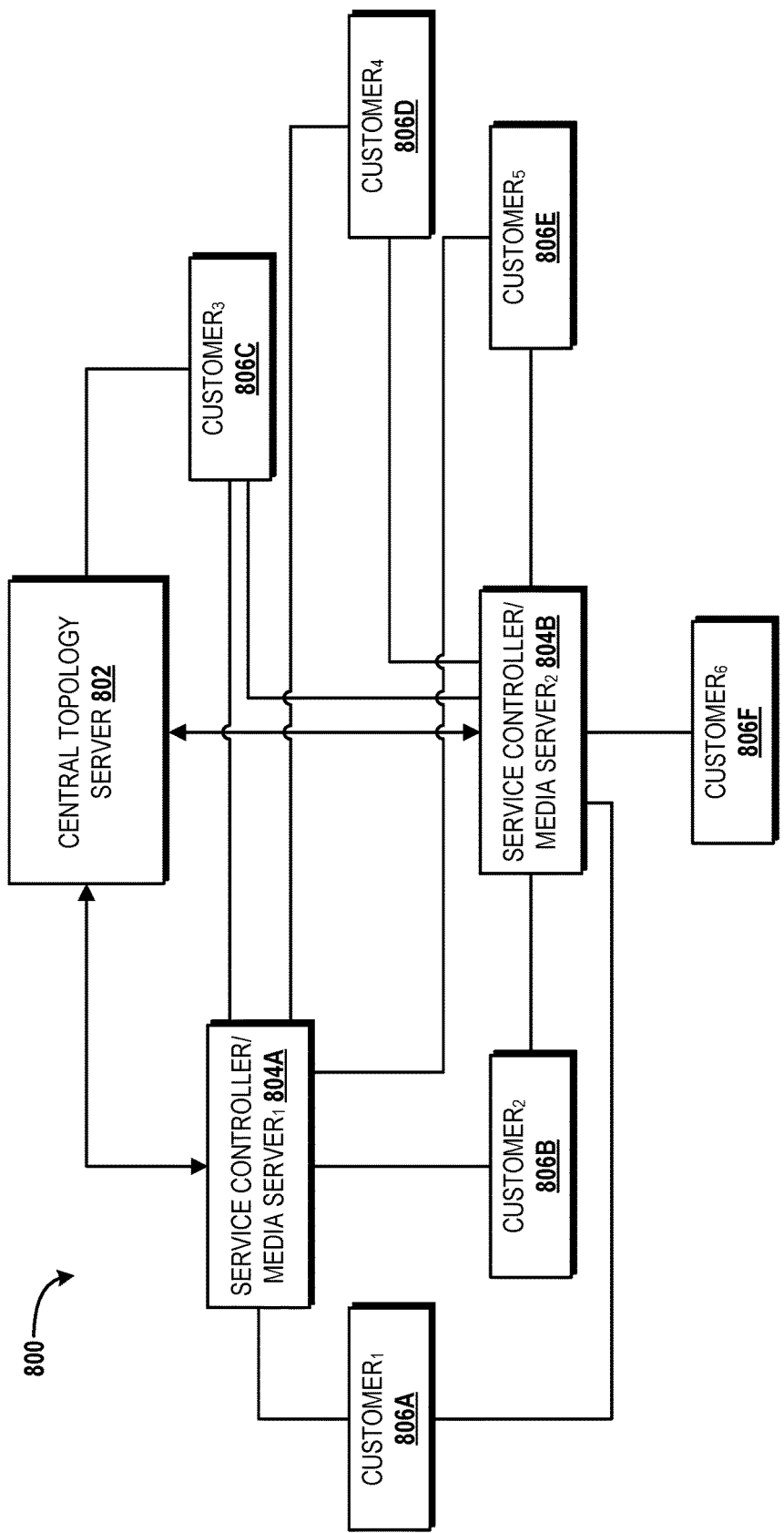
FIG. 8 is a block diagram illustrating an illustrative video conferencing service network topology capable of implementing aspects of the concepts and technologies disclosed herein.

Turning now to FIG. 8, a video conferencing service topology 800 will be described, according to an illustrative embodiment. The video conferencing service topology 800 includes a central topology server 802 operating in communication with service controllers/media servers 804A, 804B. The central topology server 802 can be implemented in the service orchestrator 120.

The service controllers/media servers 804A, 804B serve media associated with video conferences to a plurality of customers 806A-806F. The service controllers/media servers 804A, 804B can be in the same entity, such as in the illustrated example, or can be different entities as discussed in accordance with other examples disclosed herein, such as the SDN controllers 114 and the media servers 118.

Utilizing the concepts and technologies disclosed herein, a large amount of data is transmitted, whether for service controller to provide service images to user devices, or a media server to stream media to one or more clients participating as listeners. As such, each of the service controller/media servers 804A, 804B can only serve a limited number of customers/conferences for a specific region. The service controller/media server 804A, 804B for a conference is selected based upon its proximity to the customers who joined the conference.

Each of the service controller/media servers 804A, 804B only sees a small part of the virtual overlay network 102. Each of the service controller/media servers 804A, 804B can generate real-time transport control protocol ("RTCP") statistics for each media stream it serves and can forward the RTCP statistics to the central topology server 802. The central topology server 802, in view of the whole network, can know which of the service controller/media servers 804A-804B is in the optimal path for a given conference (i.e., for 1-N and N-N video conference types). If one or more additional customers join a conference and the initial service controller/media server 804A, 804B selected by the central topology server 802 at the beginning of the conference is no longer in the optimal path, the central topology server 802 can switch to a different service controller/media server 804A, 804B that is in the optimal path that includes the added customer(s). An example in which an N—N type video conference is setup will now be described. In this example, the central topology server 802 can select the service controller/media server$_1$ 804A to serve the new video conference in which the customer$_1$ 806A and the customer$_2$ 806B are participants. The central topology server 802 can use various optimal path algorithms for best media server selection (e.g., shortest distance, lowest cost, or shortest delay). A formula such as the following example formula can be used to determine the best path. Best Path with lowest value of: $\lambda 1*\text{Link}\_{Cost}+\lambda 2*\text{Link}\_{Utilization}+\lambda 3*\text{Delay}$. $\lambda$s are configurable parameters defined specifically by each service providers. Round trip delay of each RTCP session's RTCP stats can be utilized by the central topology server 802 to estimate overall conference delay and a new media server, such as the service controller/media server$_2$ 804B, can be selected based upon this criteria. After additional customers—such as the customers 806C-806F—join the conference, the central topology server 802 can decide to switch from the service controller/media server$_1$ 804A to the service controller/media server$_2$ 804B for the conference to lower overall round trip delay.

Figure 9:
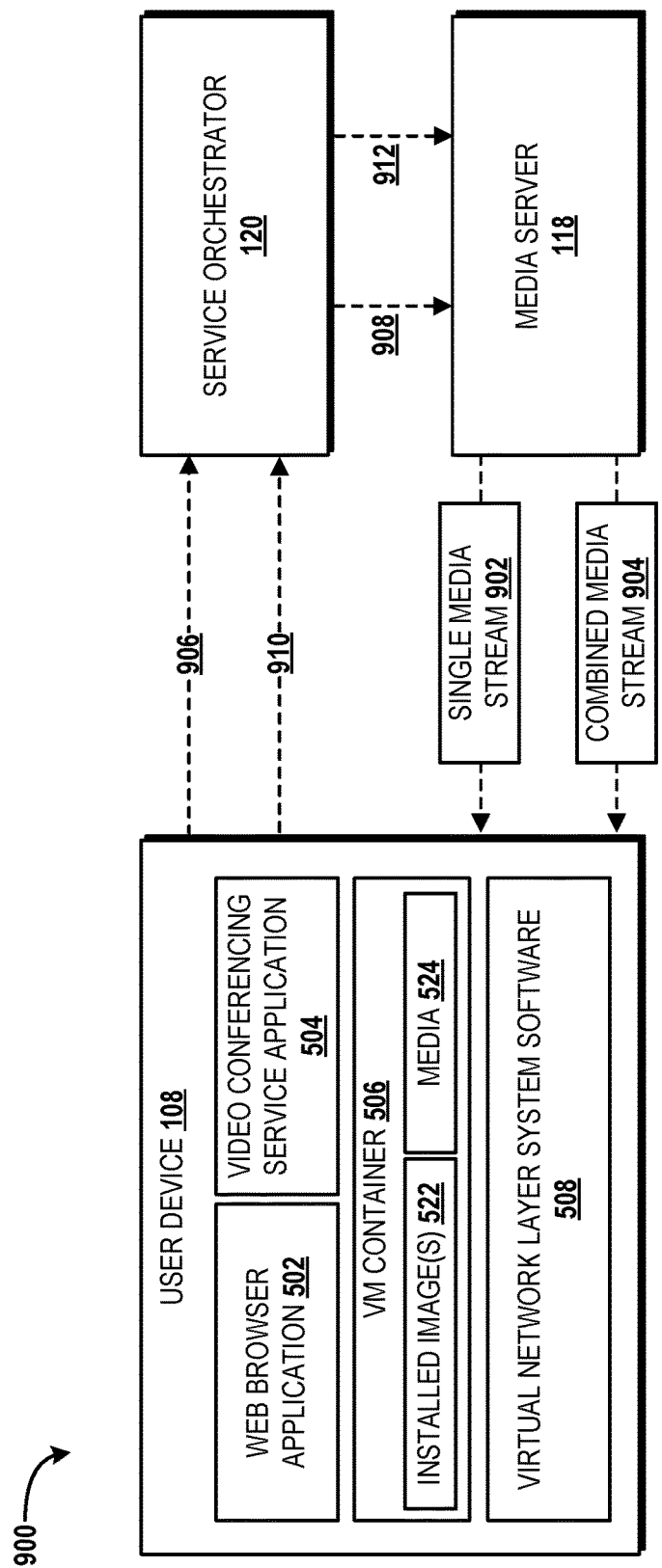
FIG. 9 is a block diagram illustrating an illustrative conference media streaming mode selection implementation, according to an illustrative embodiment.

Turning now to FIG. 9, a conference media streaming mode selection implementation 900 will be described, according to an illustrative embodiment. For an N-N conference, media from every participant is sent to the media server 118. For audio, the media server 118 can combine all audio streams into a single media stream 902. For video, the media server 118 can keep each original video stream. The media server 118 also can lower the resolution for every stream and combine all streams into a combined media stream 904. The media server 118 provides two different media streaming modes that can be selected by each participant: (1) a single media streaming mode in which a selected one of a plurality of individual participant streams is selected and provided to the user device 108 via the single media stream 902; (2) a combined media streaming mode in which all available participant streams are combined in the combined media stream 904.

The media 524 can be presented to the user in accordance with the media streaming mode selected by a user. For example, a conference window can be presented in which the video stream for each of the participants is shown in a smaller window. This is an example of presenting the combined media stream 904. Upon selection of one of the smaller windows, the media server 118 can switch to a higher resolution stream of the selected participant and the conference window can present the higher resolution stream.

In the illustrated example, the user device 108 generates a stream request (generally shown at 906) indicating whether the single media stream 902 or the combined media stream 904 is requested. As mentioned in the example above, the single media stream 902 can be selected in response to the user selecting a smaller window from a plurality of smaller windows each presenting a video stream of one of the participants in the conference. The user can exit the window presenting the single media stream 902 and return to the window presenting the combined media stream 904, thereby indicating a selection of the combined media stream 904 option. Other user interfaces for selecting a single media stream option or a combined media stream option are contemplated.

The user device 108 sends the stream request 906 to the service orchestrator 120. The service orchestrator 120, in turn, instructs (generally shown at 908) the media server 118 to stream media based upon the stream request 906. The media server 118 then streams the media to the user device 108 in accordance with the stream request 906. Subsequently, the user device 108 can generate and send a further stream request (generally shown at 910) to change from the combined media stream 904 to the single media stream 902 or vice versa. The service orchestrator 120, in turn, instructs (generally shown at 912) the media server 118 to stream media based upon the further stream request 910.

Figure 10:
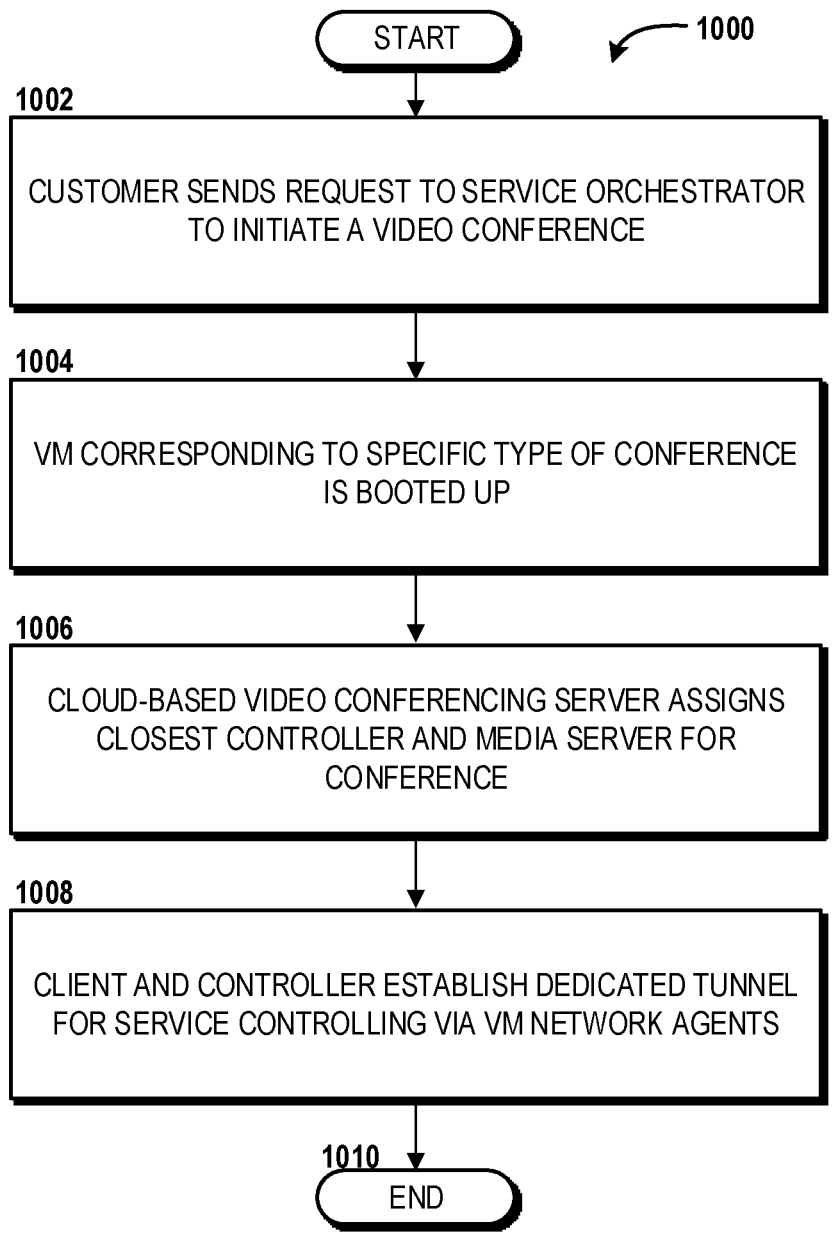
FIG. 10 is a flow diagram illustrating aspects of a method for providing a cloud-based video conferencing service, according to an illustrative embodiment.

Turning now to FIG. 10, aspects of a method 1000 for providing a cloud-based video conferencing service will be described, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing one or more processors disclosed herein to perform operations.

For purposes of illustrating and describing some of the concepts of the present disclosure, the method 1000 is described as being performed, at least in part, by one of the processors via execution of one or more software modules. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 1000 will be described with reference to FIG. 10 and further reference to FIGS. 1, 2, 5, 7A-7C, and 8. The method 1000 begins at operation 1002, where a customer (e.g., one of the customers 806) sends, via his or her user device 108, a request (e.g., the request 704, 712, or 720) to the service orchestrator 120 to initiate a video conference. The request identifies the type of conference—that is, 1-1 (704), 1-N (712), or N-N (720). From operation 1002, the method 1000 proceeds to operation 1004, where a VM corresponding to the specific type of conference requested is booted up. If the user device 108 is a smartphone, the client application can be either a process running on its native OS, or using a hypervisor to launch a VM.

From operation 1004, the method 1000 proceeds to operation 1006, where the service orchestrator 120 assigns the closest service controller and media server for the video conference based upon, for example, various optimal path algorithms for best media server selection (e.g., shortest distance, lowest cost, or shortest delay). From operation 1006, the method 1000 proceeds to operation 1008, where the client (e.g., 702A and the selected service controller (e.g., 114) establish a dedicated GTP tunnel for service controlling via the respective VM network agents (204). From operation 1008, the method 1000 proceeds to operation 1010, where the method 1000 ends.

Figure 11:
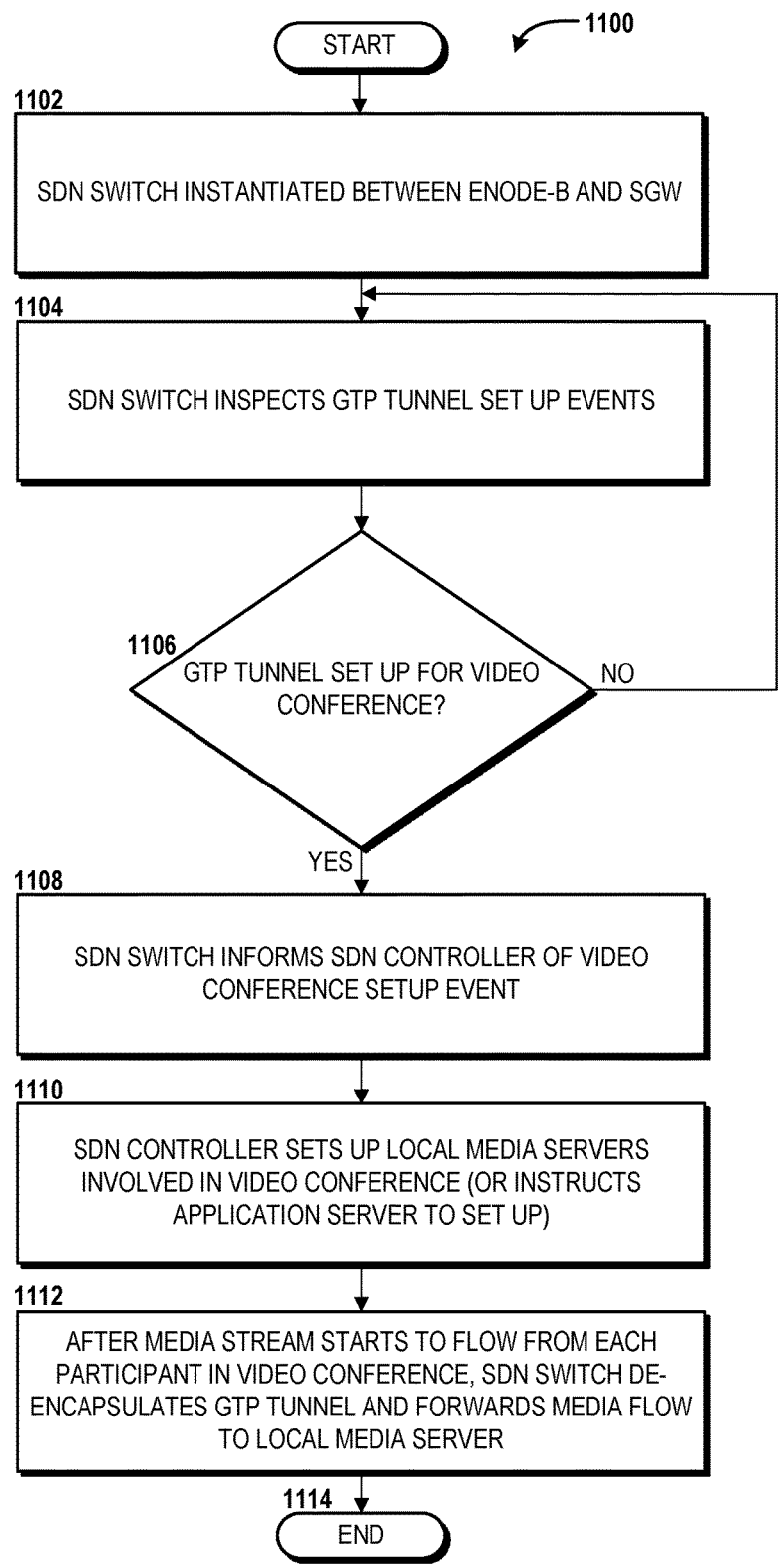
FIG. 11 is a flow diagram illustrating aspects of a method for handling media flow associated with a video conference, according to an illustrative embodiment.

Turning now to FIG. 11, a method 1100 for handling media flow associated with a video conference will be described, according to an illustrative embodiment. The method 1100 will be described with reference to FIG. 11 and further reference to FIGS. 1, 2, 5, 7A-7C, and 8. The method 1100 begins and proceeds to operation 1102, where an SDN switch (e.g., the SDN element 112) is instantiated between the eNB 124 and the SGW 128. From operation 1102, the method 1100 proceeds to operation 1104, where the SDN switch 112 inspects traffic between the eNB 124 and the SGW 128 for GTP tunnel set up events corresponding to a video conference setup. GTP tunnels are built between client virtual switch and service gateway. Private IPs are used by service end points. Client virtual switch and service gateways are responsible for packaging and unpackaging media packets and tunneling them through GTP tunnels.

From operation 1104, the method 1100 proceeds to operation 1106, where the SDN switch 112 determines if a GTP tunnel has been set up for a video conference. If not the method 1100 returns to operation 1104. If, however, the SDN switch 112 determines that a GTP tunnel has been set up for a video conference, the method 1000 proceeds to operation 1108, where the SDN switch 112 informs the SDN controller 114 of the video conference setup event.

From operation 1108, the method 1100 proceeds to operation 1110, where the SDN controller 114 sets up one or more of the media servers 118 to be involved in the video conference. Alternatively, the SDN controller 114 can instruct the service orchestrator 120 to set up the media server(s) 124. From operation 1110, the method 1000 proceeds to operation 1112, where after the media stream starts to flow from each participant in the video conference, the SDN switch 112 de-encapsulates the media stream data in the GTP tunnel and forwards the media stream data to the media server(s) 124. From operation 1112, the method 1100 proceeds to operation 1114, where the method 1100 ends.

Figure 12:
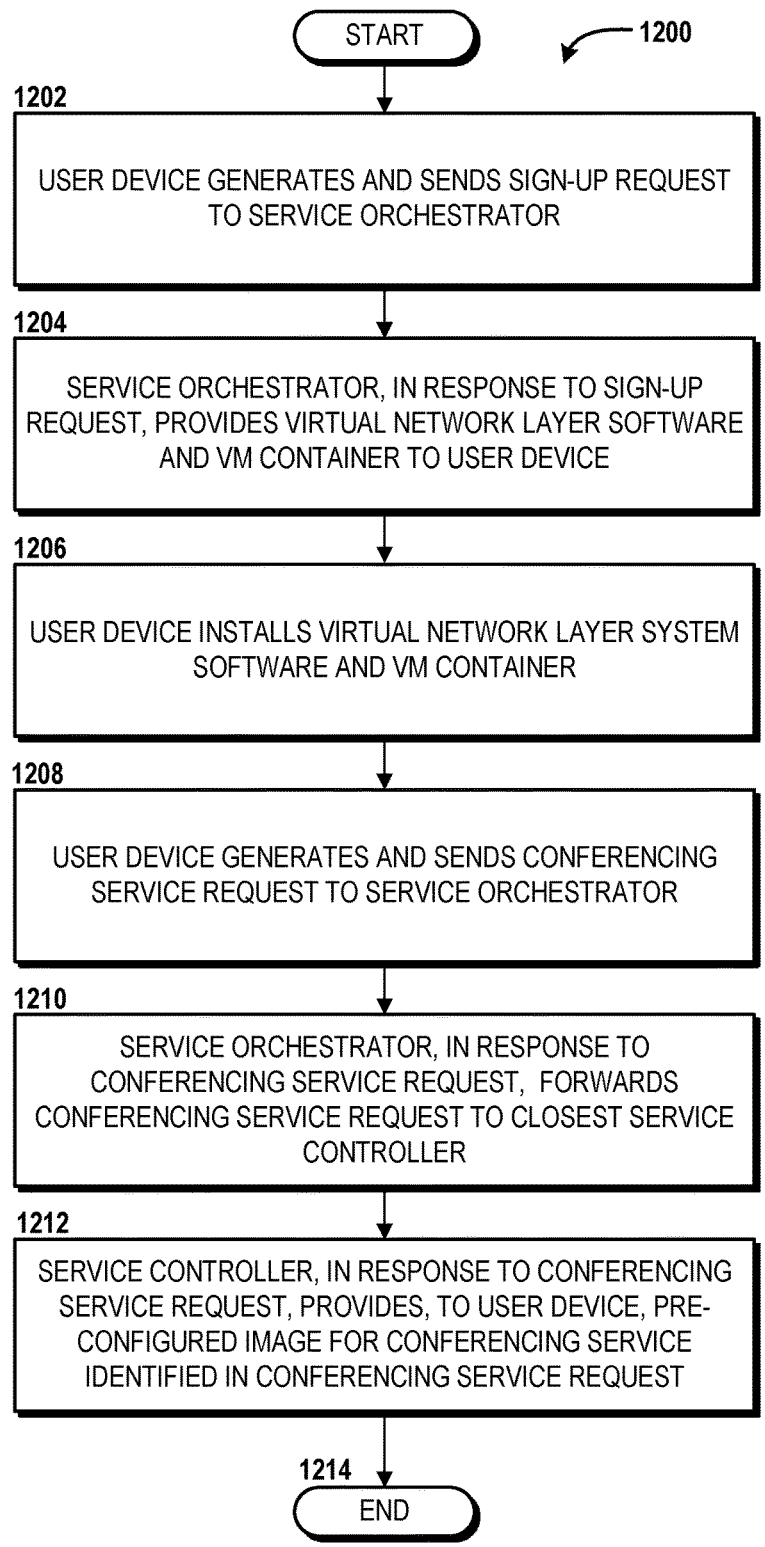
FIG. 12 is a flow diagram illustrating aspects of a method for setting up a user device for a video conferencing service, according to an illustrative embodiment.

Turning now to FIG. 12, a method 1200 for setting up a user device (e.g., the user device 108) for a video conferencing service will be described, according to an illustrative embodiment. The method 1200 will be described with reference to FIG. 12 and further reference to FIG. 5. The method 1200 begins and proceeds to operation 1202, where the user device 108 generates and sends a customer sign up request (e.g., 510) to the service orchestrator 120. From operation 1202, the method 1200 proceeds to operation 1204, where the service orchestrator 120, in response to the customer service request 510, provides the virtual network layer system software 508 and the VM container 506 to the user device 108. From operation 1204, the method 1200 proceeds to operation 1206, where the user device 108 installs the virtual network layer system software 508 and the VM container 506.

From operation 1206, the method 1200 proceeds to operation 1208, where the user device 108 generates and sends a service request (e.g., 514) to the service orchestrator 120. From operation 1208, the method 1200 proceeds to operation 1210, where the service orchestrator 120, in response to the service request 514, forwards the service request to the closest service controller (e.g., the SDN controller 114 in the example shown in FIG. 5). From operation 1210, the method 1200 proceeds to operation 1212, where the SDN controller 114, in response to the service request 514, provides, to the user device 108, a pre-configured service image (e.g., one of the conference images 518) for the conferencing service type identified in the service request 514. From operation 1212, the method 1200 proceeds to operation 1214, where the method 1200 ends.

Figure 13:
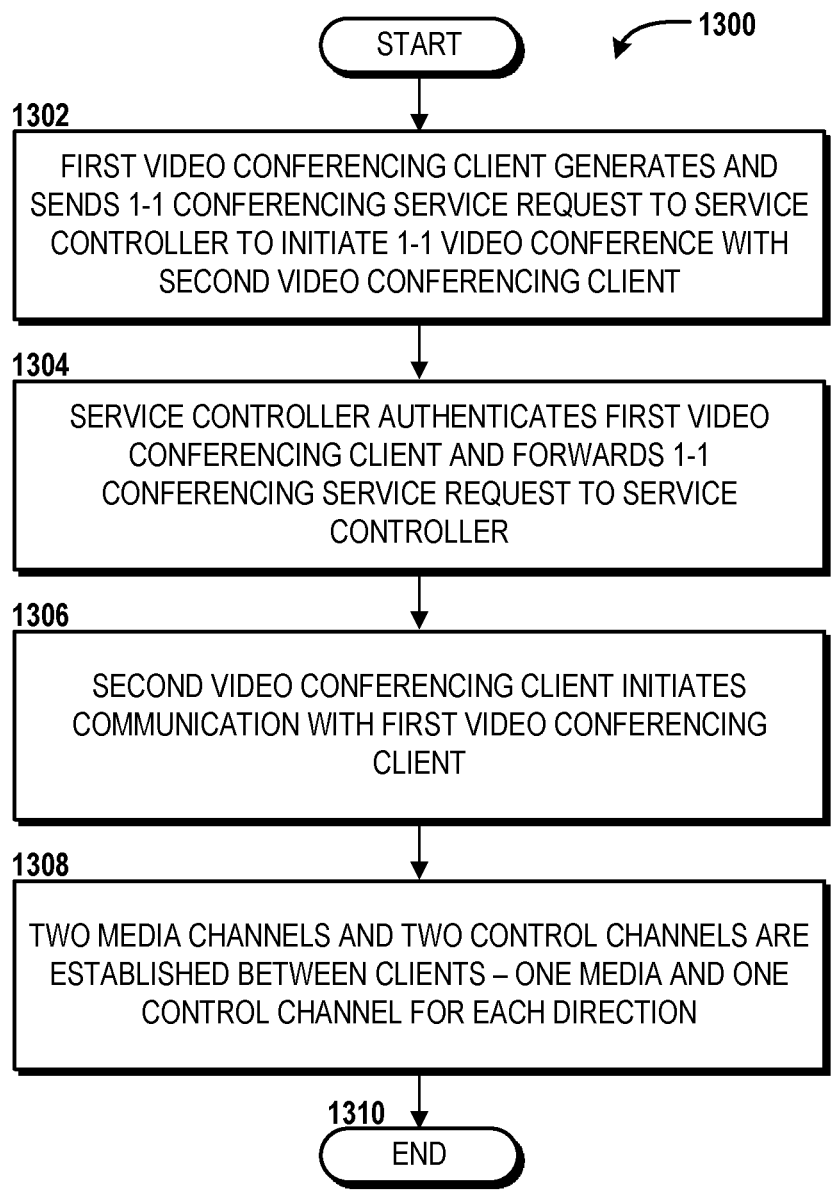
FIG. 13 is a flow diagram illustrating aspects of a method for establishing a 1-1 video conference, according to an illustrative embodiment.

Turning now to FIG. 13, a method 1300 for establishing a 1-1 video conference will be described, according to an illustrative embodiment. The method 1300 will be described with reference to FIG. 13 and further reference to FIG. 7A. The method 1300 begins and proceeds to operation 1302, where the first video conferencing client 702A generates and sends a 1-1 conferencing service request (e.g., 704) to the SDN controller 114 to initiate a 1-1 video conference with the second video conferencing client 702B. From operation 1302, the method 1300 proceeds to operation 1304, where the service controller 704 authenticates the first video conferencing client 702A and forwards the request (e.g., 706) to the second video conferencing client 702B. The authentication can utilize authentication credentials such as username and password. From operation 1304, the method 1300 proceeds to operation 1306, where the second video conferencing client 702B receives the forwarded request and, in response, initiates communication with the first video conferencing client 702A. From operation 1306, the method 1300 proceeds to operation 1308, where two media channels and two control channels are established between the clients—one media and one control channel for each direction of media flow. From operation 1308, the method 1300 proceeds to operation 1310, where the method 1300 ends.

Figure 14:
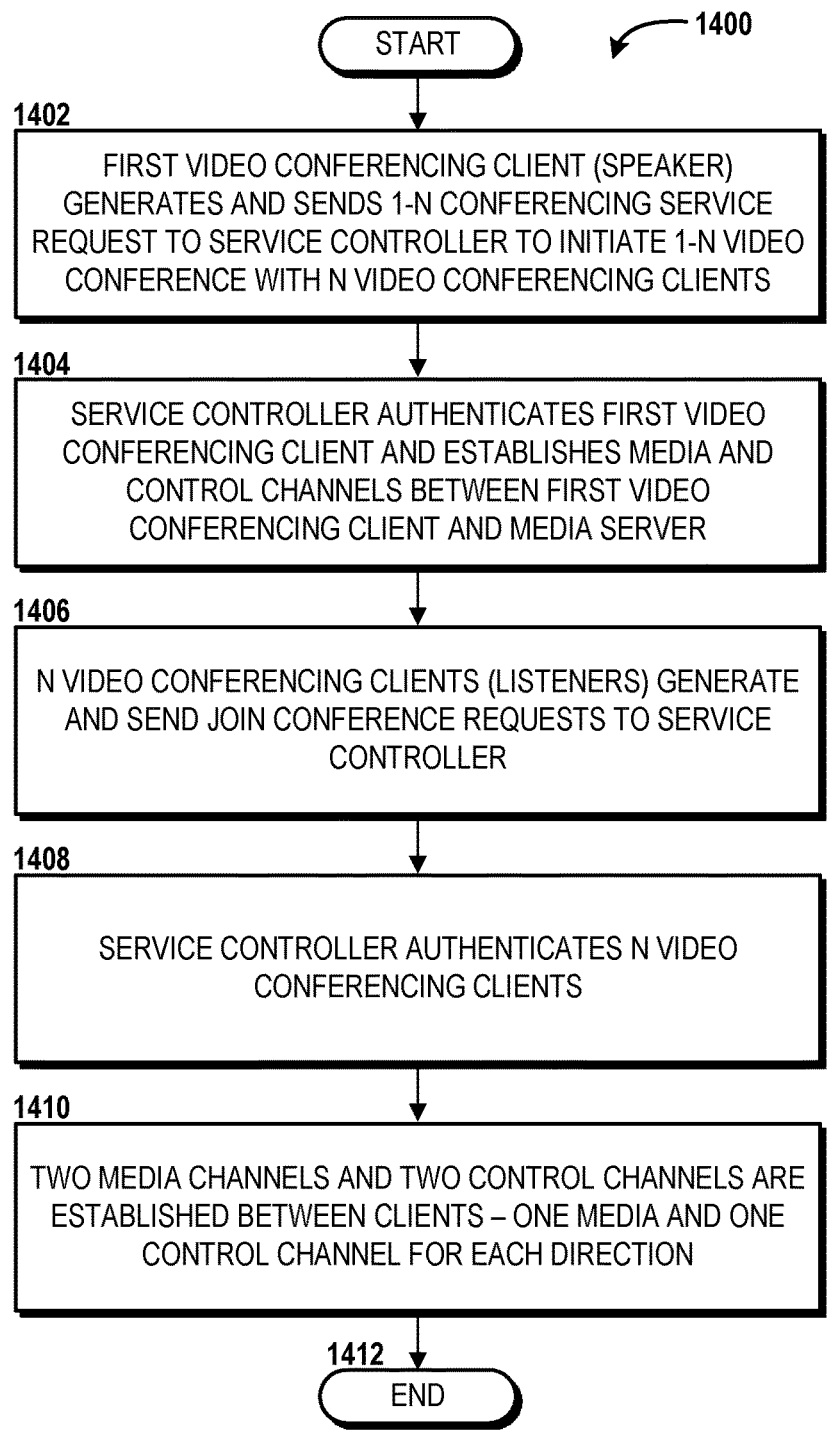
FIG. 14 is a flow diagram illustrating aspects of a method for establishing a 1-N video conference, according to an illustrative embodiment.

Turning now to FIG. 14, a method 1400 for establishing a 1-N video conference will be described, according to an illustrative embodiment. The method 1400 will be described with reference to FIG. 14 and further reference to FIG. 7B. The method 1400 begins and proceeds to operation 1402, where the first video conferencing client 702A generates and sends a 1-N conferencing service request (e.g., 712) to the SDN controller 114 to initiate a 1-N video conference. The participants in the 1-N video conferencing include a first user who is to participate in the 1-N video conference as the sole speaker, and N other users who are to participate in the 1-N video conference as listeners.

From operation 1402, the method 1400 proceeds to operation 1404, where the SDN controller 114 authenticates the first video conferencing client 702A and establishes media and control channels between the first video conferencing client 702A and the media server 118. From operation 1404, the method 1400 proceeds to operation 1406, where N video conferencing clients (i.e., clients associated with the listeners) generate and send join conference requests (e.g., 714, 716) to the SDN controller 114. In response, the SDN controller 114, at operation 1408, authenticates the N video conferencing clients.

From operation 1408, the method 1400 proceeds to operation 1410, where two media channels and two control channels are established between the first video conferencing client 702A and each of the N (listeners) video conferencing clients 702B, 702C. One media channel and one control channel are established for each direction of communication. From operation 1410, the method 1400 proceeds to operation 1412, where the method 1400 ends.

Figure 15:
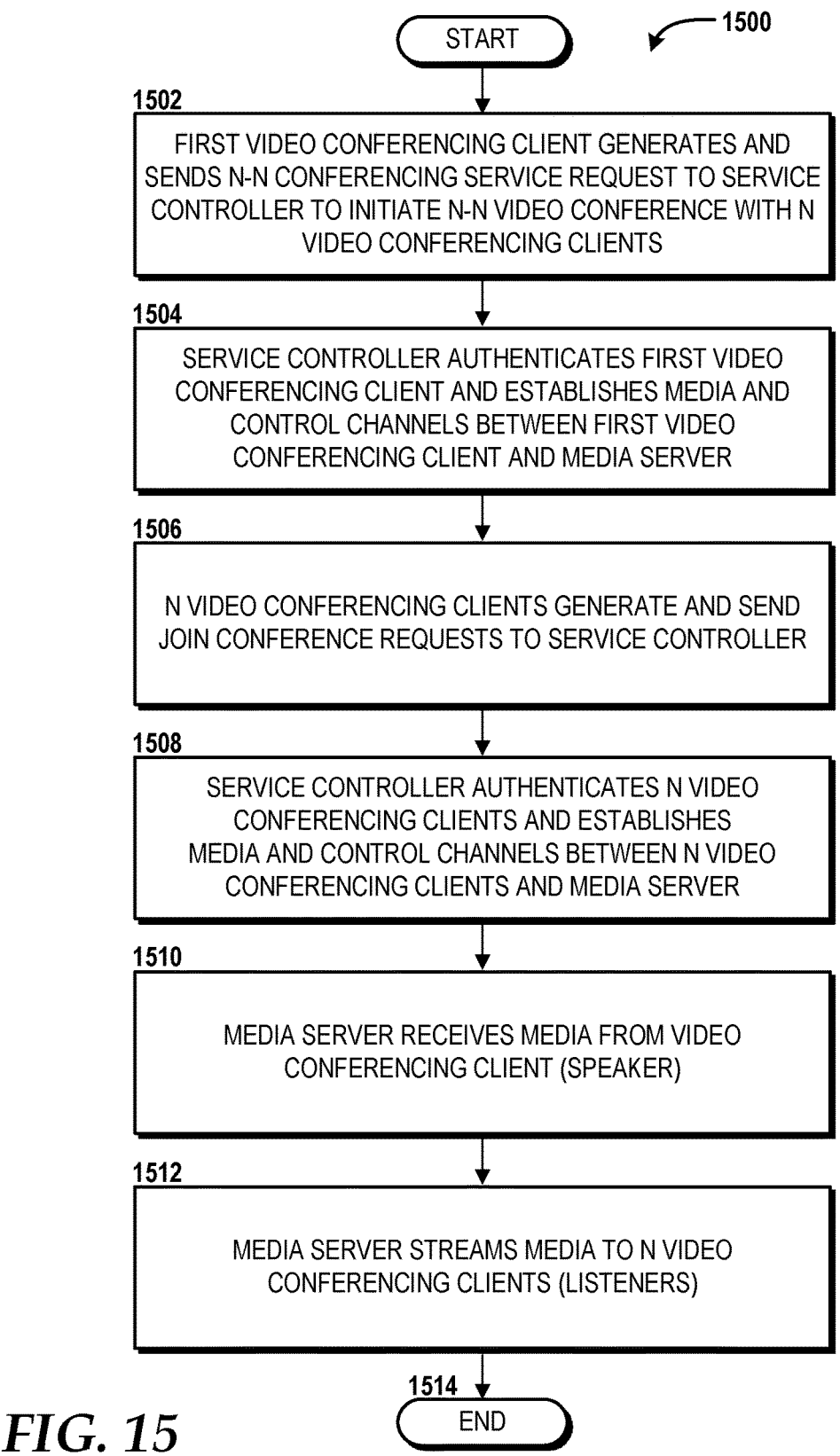
FIG. 15 is a flow diagram illustrating aspects of a method for establishing an N-N video conference, according to an illustrative embodiment.

Turning now to FIG. 15, a method 1500 for establishing an N-N video conference will be described, according to an illustrative embodiment. The method 1500 will be described with reference to FIG. 15 and further reference to FIGS. 7C and 9. The method 1500 begins and proceeds to operation 1502, where the first video conferencing client 702A generates and sends an N-N conferencing service request (e.g., 720) to the SDN controller 114 to initiate an N-N video conference. The participants in the N-N video conferencing include N speakers and N listeners.

From operation 1502, the method 1500 proceeds to operation 1504, where the SDN controller 114 authenticates the first video conferencing client 702A and establishes media and control channels between the first video conferencing client 702A and the media server 118. From operation 1504, the method 1500 proceeds to operation 1506, where N video conferencing clients (e.g., 702B, 702C) generate and send join conference requests (e.g., 722, 724) to the SDN controller 114. From operation 1506, the method 1500 proceeds to operation 1508, where the SDN controller 114 authenticates the N video conferencing clients (e.g., 702B, 702C) and establishes media and control channels between N video conferencing clients (e.g., 702B, 702C) and the media server 118.

From operation 1508, the method 1500 proceeds to operation 1510, where the media server 118 receives media from a video conferencing client participating as a speaker (at this point in time). From operation 1510, the method 1500 proceeds to operation 1512, where the media server 118 streams the media to N video conferencing client participating as listeners. From operation 1512, the method 1500 proceeds to operation 1514, where the method 1500 ends.

Figure 16:
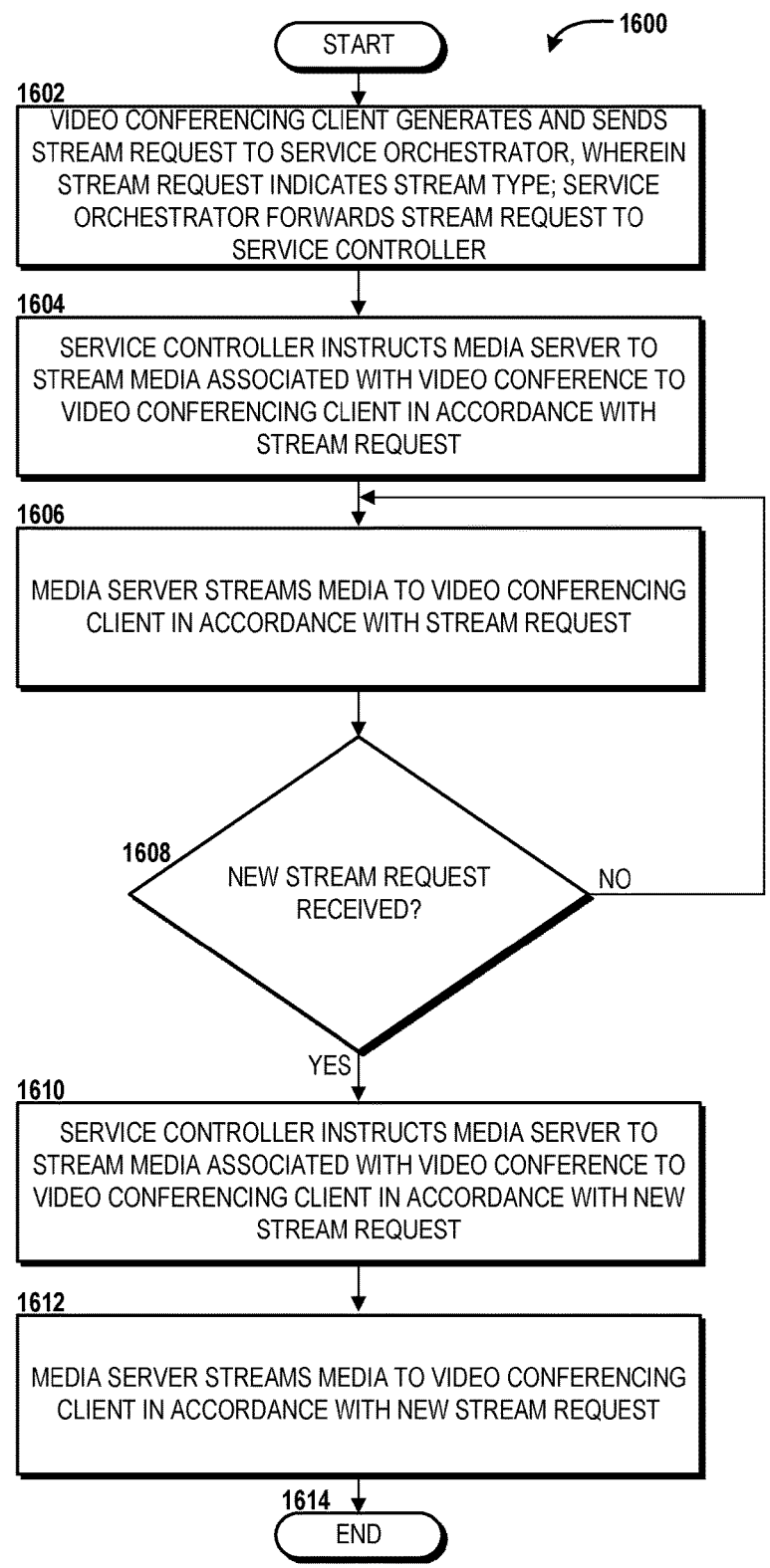
FIG. 16 is a flow diagram illustrating aspects of a method for streaming media associated with a video conference, according to an illustrative embodiment.

Turning now to FIG. 16, a method 1600 for streaming media associated with a video conference will be described, according to an illustrative embodiment. The method 1600 will be described with reference to FIG. 16 and further reference to FIG. 9. The method 1600 begins and proceeds to operation 1602, where the video conferencing client 702 generates and sends a stream request (e.g., 906) to the service orchestrator 120. The stream request indicates a stream type—that is, either the single media stream 902 or the combined media stream 904. The service orchestrator 120 also can forward the stream request to the SDN controller 114 handling the video conference.

From operation 1602, the method 1600 proceeds to operation 1604, where the SDN controller 114 instructs the media server 118 to stream media associated with the video conference to the video conferencing client 702 in accordance with the stream type identified in the stream request. From operation 1604, the method 1600 proceeds to operation 1606, where the media server 118 streams the media associated with the video conference to the video conferencing client 702 in accordance with the stream type identified in the stream request.

From operation 1606, the method 1600 proceeds to operation 1608, where the SDN controller 114 determines whether a new stream request (e.g., 910) has been received. If not, the method 1600 returns to operation 1606, where the media server 118 continues to stream the media to the video conferencing client 702 in accordance with the stream request received at operation 1602. If, however, the SDN controller 114 receives a new stream request, the method 1600 proceeds to operation 1610, where the SDN controller 114 instructs the media server 118 to stream media associated with the video conference to the video conferencing client 702 in accordance with the stream type identified in the new stream request. From operation 1610, the method 1600 proceeds to operation 1612, where the media server 118 streams the media to the video conferencing client 702 in accordance with the new stream request. From operation 1612, the method 1600 proceeds to operation 1614, where the method 1600 ends.

Figure 17A:
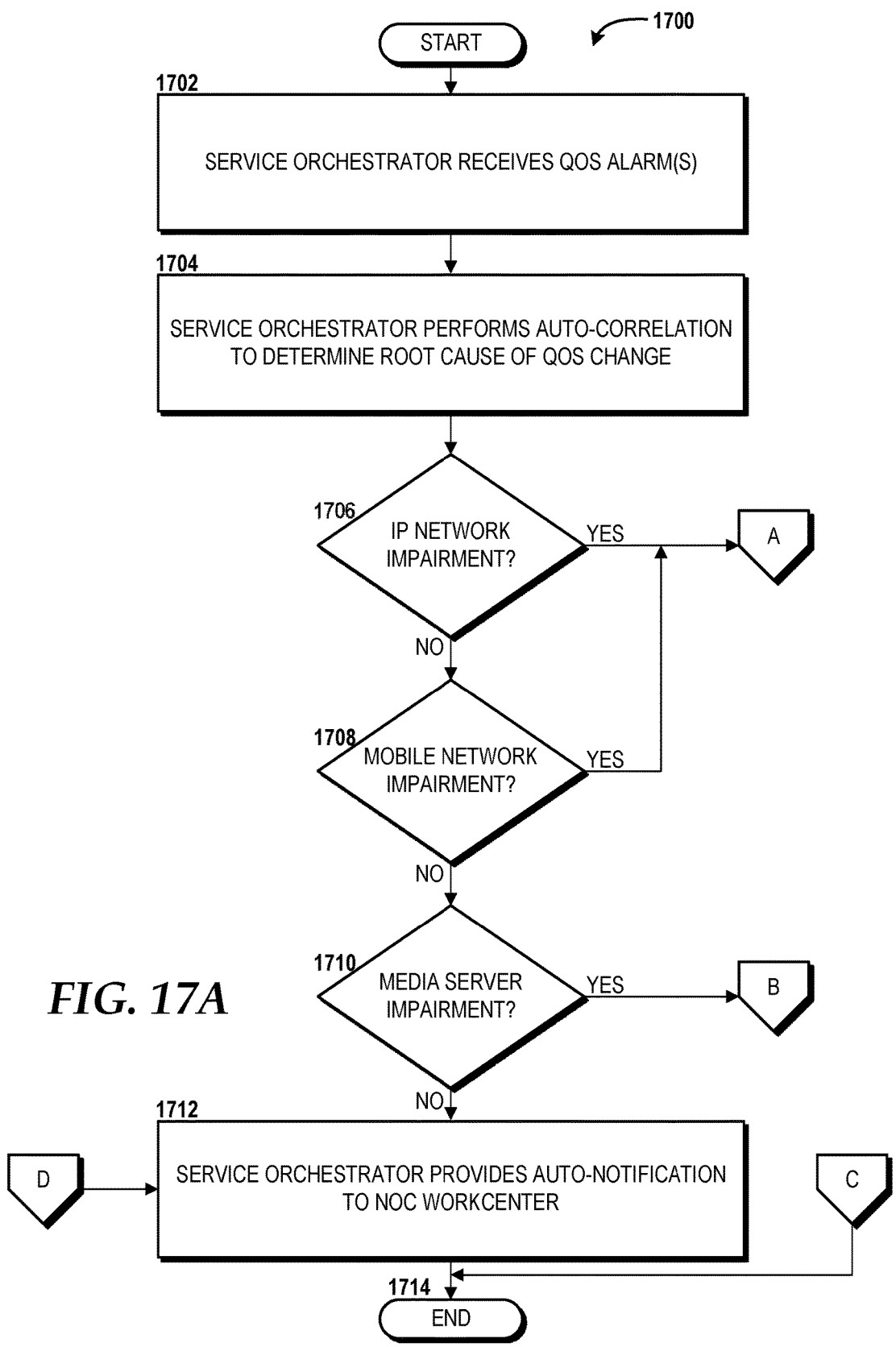
FIGS. 17A-17B are flow diagrams illustrating aspects of a method for optimizing QoS during a video conference, according to an illustrative embodiment.

Turning now to FIG. 17A, a method 1700 for optimizing QoS during video conference will be described, according to an illustrative embodiment. The method 1700 begins and proceeds to operation 1702, where the service orchestrator 120 receives one or more QoS alerts/alarms and/or one or more QoE alerts/alarms from the SDN controller 114 currently servicing the video conference. These alerts/alarms can include media quality alerts/alarms, end-to-end delay/frame loss rate/video freeze duration, and the like. The QoS alarms can be generated by the SDN controller 114 in response to QoS currently being provided for the video conference falling outside of QoS parameters established in the QoS policies 116.

From operation 1702, the method 1700 proceeds to operation 1704, where the service orchestrator 120 performs auto-correlation operations to determine the root cause of the QoS change. From operation 1704, the method 1700 proceeds to operation 1706, where the service orchestrator 120 determines if the root cause of the QoS change is due to IP transport network impairment, including, for example, transmission delay packet loss, insufficient network bandwidth, and/or the like. If not, the method 1700 proceeds to operation 1708, where the service orchestrator 120 determines if the root cause of the QoS change is due to mobile network impairment, including, for example path loss, noise, fading, overload, and/or the like. If not, the method 1700 proceeds to operation 1710, where the service orchestrator 120 determines if the root cause of the QoS change is due to media server impairment, including, for example, insufficient bandwidth, utilization and response time over threshold values, process alerts/alarms, and/or the like. If not, the method 1700 proceeds to operation 1712, where the service orchestrator 120 provides an auto-notification to a network operations center. From operation 1712, the method 1700 proceeds to operation 1714, where the method 1700 ends.

Figure 17B:
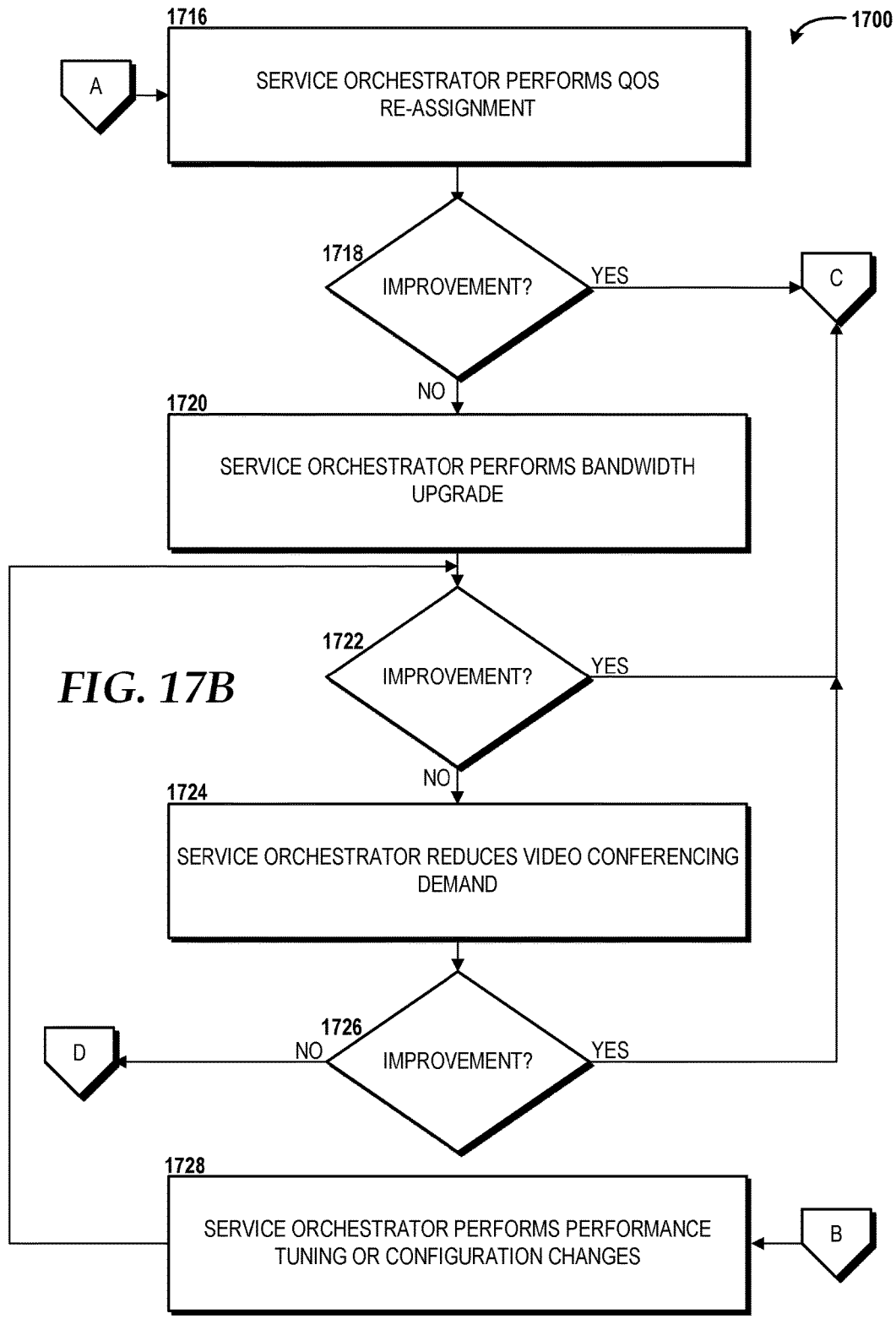

Returning to operation 1706, if the service orchestrator 120 determines that the root cause of the QoS change is due to IP network impairment, the method 1706 moves to operation 1716, which is shown in FIG. 17B. Turning now to FIG. 17B, and particularly to operation 1716, the service orchestrator 120 performs QoS re-assignment. From operation 1716, the method 1700 proceeds to operation 1718, where the service orchestrator 120 determines whether any improvement was made. If so, the method 1700 returns to FIG. 17A, and particularly to operation 1714, where the method 1700 ends. If, however, no improvement was made (or if the improvement was less than a pre-specified minimum threshold of improvement), then the method 1700 proceeds to operation 1720, where the service orchestrator 120 performs a bandwidth upgrade.

From operation 1720, the method 1700 proceeds to operation 1722, where the service orchestrator 120 determines whether any improvement was made. If so, the method 1700 returns to FIG. 17A, and particularly to operation 1714, where the method 1700 ends. If, however, no improvement was made (or if the improvement was less than a pre-specified minimum threshold of improvement), then the method 1700 proceeds to operation 1724, where the service orchestrator 120 reduces video conferencing demand to that a limited number of calls can occur simultaneously across each channel.

From operation 1724, the method 1700 proceeds to operation 1726, where the service orchestrator 120 determines whether any improvement was made. If so, the method 1700 returns to FIG. 17A, and particularly to operation 1714, where the method 1700 ends. If, however, no improvement was made (or if the improvement was less than a pre-specified minimum threshold of improvement), then the method 1700 returns to FIG. 17A, and particularly, to operation 1712, where the service orchestrator 120 provides an auto-notification to a network operations center. From operation 1712, the method 1700 proceeds to operation 1714, where the method 1700 ends.

Returning to operation 1708, if the service orchestrator 120 determines that the root cause of the QoS change is due to mobile network impairment, the method 1706 moves to operation 1716, which is shown in FIG. 17B. The method 1700 continues as described above.

Returning to operation 1710, if the service orchestrator 120 determines that the root cause of the QoS change is due to media server impairment, the method 1700 moves to operation 1728, which is shown in FIG. 17B. At operation 1728, the service orchestrator 120 performs performance tuning and/or configuration changes. From operation 1728, the method 1700 proceeds to operation 1722. The method 1700 continues as described above.

Figure 18:
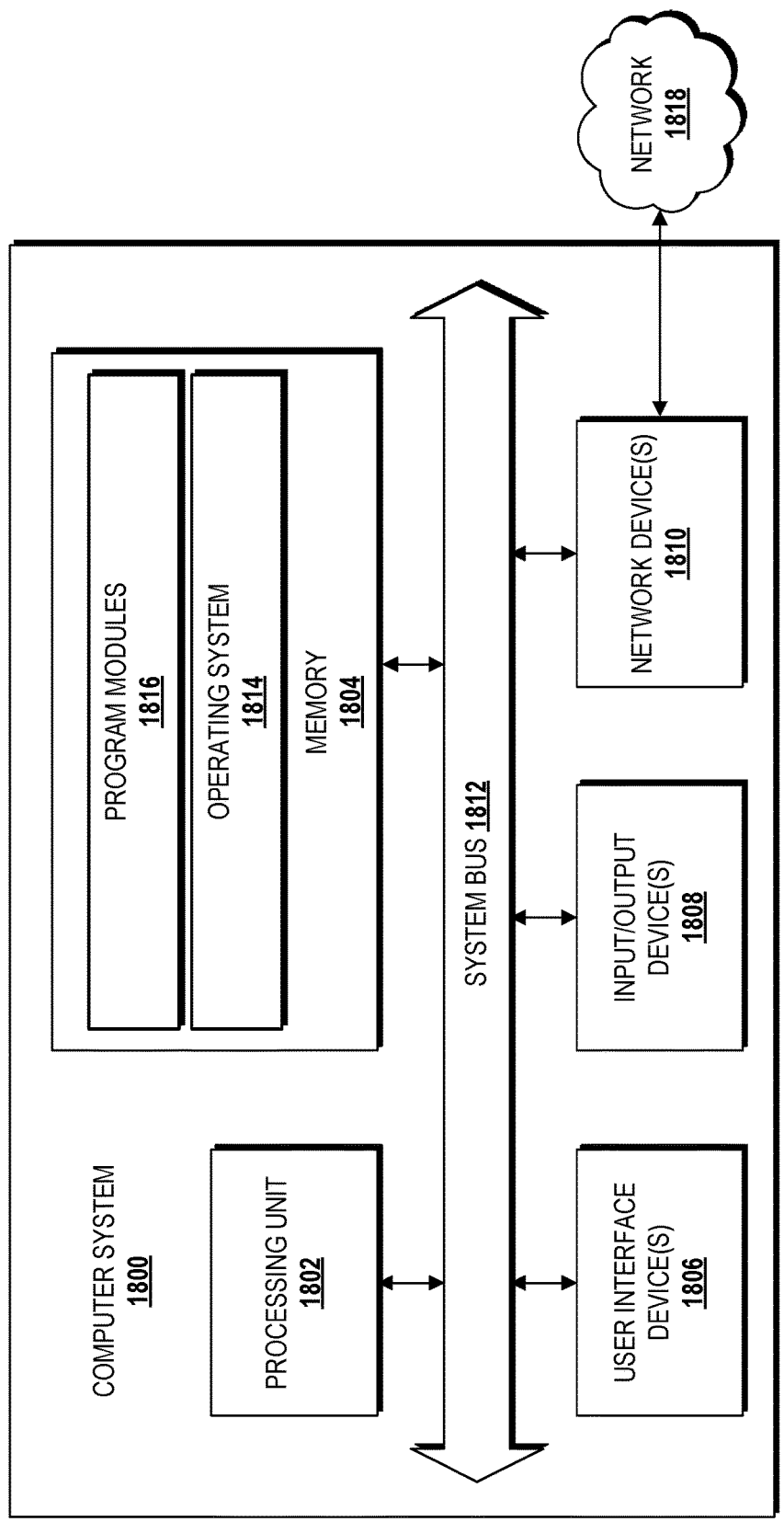
FIG. 18 is a block diagram illustrating an example computer system and components thereof capable of implementing aspects of the embodiments presented herein.

Turning now to FIG. 18 is a block diagram illustrating a computer system 1800 configured to provide the functionality in accordance with various embodiments of the concepts and technologies disclosed herein. The systems, devices, and other components disclosed herein can utilize, at least in part, an architecture that is the same as or at least similar to the architecture of the computer system 1800. For example, the user devices 108, the eNBs 124, the SGWs 128, the MMEs 130, the PGWs 132, other elements of the EPCs 126, the service orchestrator 120, the SDN controller 114, the SDN elements 112, the media servers 118, or some combination thereof can utilize, at least in part, an architecture that is the same as or at least similar to the architecture of the computer system 1800. It should be understood, however, that modification to the architecture may be made to facilitate certain interactions among elements described herein.

The computer system 1800 includes a processing unit 1802, a memory 1804, one or more user interface devices 1806, one or more I/O devices 1808, and one or more network devices 1810, each of which is operatively connected to a system bus 1812. The bus 1812 enables bi-directional communication between the processing unit 1802, the memory 1804, the user interface devices 1806, the I/O devices 1808, and the network devices 1810.

The processing unit 1802 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein.

The memory 1804 communicates with the processing unit 1802 via the system bus 1812. In some embodiments, the memory 1804 is operatively connected to a memory controller (not shown) that enables communication with the processing unit 1802 via the system bus 1812. The illustrated memory 1804 includes an operating system 1814 and one or more program modules 1816. The operating system 1814 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, OS X, and/or iOS families of operating systems from APPLE CORPORATION, the FREEBSD family of operating systems, the SOLARIS family of operating systems from ORACLE CORPORATION, other operating systems, and the like.

The program modules 1816 may include various software and/or program modules to perform the various operations described herein. The program modules 1816 and/or other programs can be embodied in computer-readable media containing instructions that, when executed by the processing unit 1802, perform various operations such as those described herein. According to embodiments, the program modules 1816 may be embodied in hardware, software, firmware, or any combination thereof.

By way of example, and not limitation, computer-readable media may include any available computer storage media or communication media that can be accessed by the computer system 1800. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 1800. In the claims, the phrase "computer storage medium" and variations thereof does not include waves or signals per se and/or communication media.

The user interface devices 1806 may include one or more devices with which a user accesses the computer system 1800. The user interface devices 1806 may include, but are not limited to, computers, servers, personal digital assistant ("PDAs"), cellular phones, or any suitable computing devices. The I/O devices 1808 enable a user to interface with the program modules 1816. In one embodiment, the I/O devices 1808 are operatively connected to an I/O controller (not shown) that enables communication with the processing unit 1802 via the system bus 1812. The I/O devices 1808 may include one or more input devices, such as, but not limited to, a keyboard, a mouse, or an electronic stylus. Further, the I/O devices 1808 may include one or more output devices, such as, but not limited to, a display screen or a printer. In some embodiments, the I/O devices 1808 can be used for manual controls for operations to exercise under certain emergency situations.

The network devices 1810 enable the computer system 1800 to communicate with other networks or remote systems via a network 1818. Examples of the network devices 1810 include, but are not limited to, a modem, a radio frequency ("RF") or infrared ("IR") transceiver, a telephonic interface, a bridge, a router, or a network card. The network 1818 may be or may include a wireless network such as, but not limited to, a Wireless Local Area Network ("WLAN"), a Wireless Wide Area Network ("WWAN"), a Wireless Personal Area Network ("WPAN") such as provided via BLUETOOTH technology, a Wireless Metropolitan Area Network ("WMAN") such as a WiMAX network or metropolitan cellular network. Alternatively, the network 1818 may be or may include a wired network such as, but not limited to, a Wide Area Network ("WAN"), a wired Personal Area Network ("PAN"), or a wired Metropolitan Area Network ("MAN"). The network 1818 can be or can include the virtual overlay network 102, the IP transport network 104, or any other network or combination of networks described herein.

Figure 19:
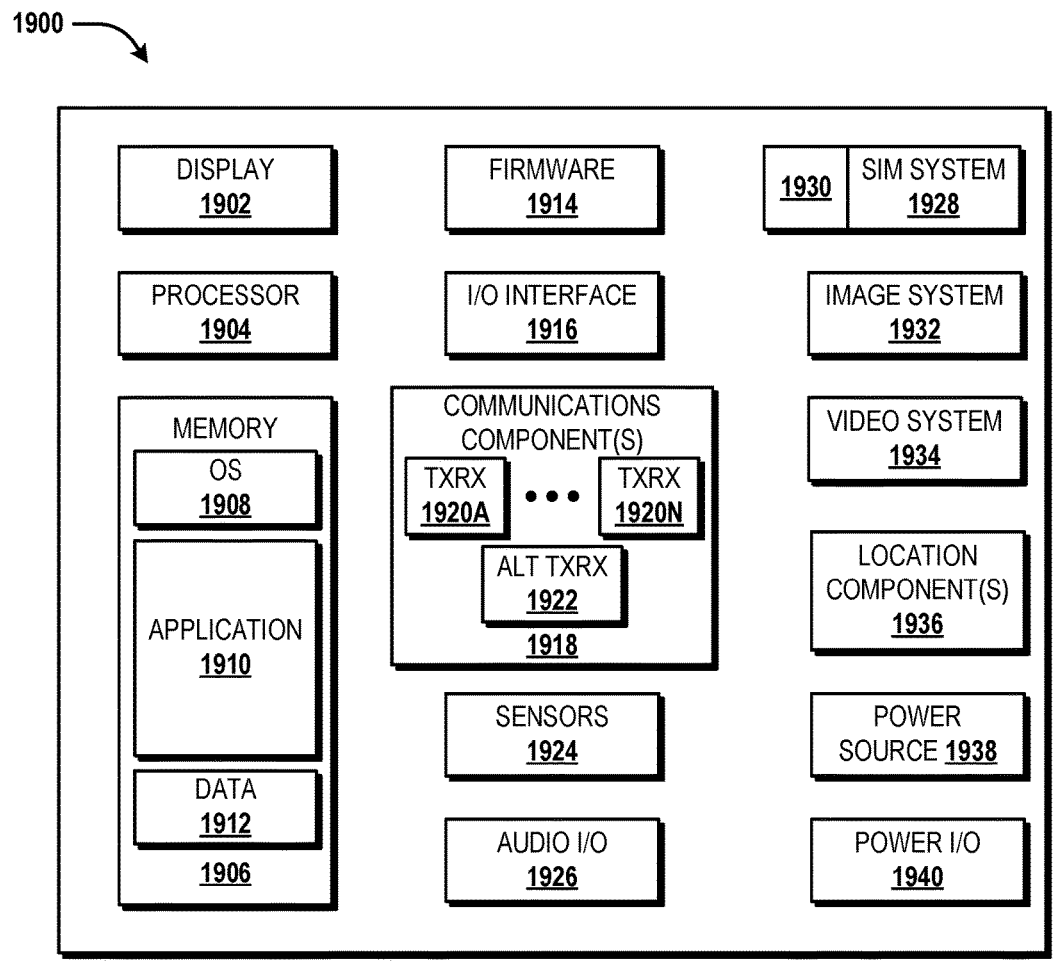
FIG. 19 is a block diagram illustrating an example mobile device and components thereof capable of implementing aspects of the embodiments presented herein.

Turning now to FIG. 19, an illustrative mobile device 1900 and components thereof will be described. In some embodiments, one or more of the user devices 108 can be configured like the mobile device 1900. While connections are not shown between the various components illustrated in FIG. 19, it should be understood that some, none, or all of the components illustrated in FIG. 19 can be configured to interact with one other to carry out various device functions. In some embodiments, the components are arranged so as to communicate via one or more busses (not shown). Thus, it should be understood that FIG. 19 and the following description are intended to provide a general understanding of a suitable environment in which various aspects of embodiments can be implemented, and should not be construed as being limiting in any way.

As illustrated in FIG. 19, the mobile device 1900 can include a display 1902 for displaying data. According to various embodiments, the display 1902 can be configured to display various graphical user interface ("GUI") elements, text, images, video, virtual keypads and/or keyboards, messaging data, notification messages, metadata, internet content, device status, time, date, calendar data, device preferences, map and location data, combinations thereof, and/or the like. The mobile device 1900 also can include a processor 1904 and a memory or other data storage device ("memory") 1906. The processor 1904 can be configured to process data and/or can execute computer-executable instructions stored in the memory 1906. The computer-executable instructions executed by the processor 1904 can include, for example, an operating system 1908, one or more applications 1910, other computer-executable instructions stored in a memory 1906, or the like. In some embodiments, the applications 1910 also can include a user interface ("UP") application (not illustrated in FIG. 19).

The UI application can interface with the operating system 1908 to facilitate user interaction with functionality and/or data stored at the mobile device 1900 and/or stored elsewhere. In some embodiments, the operating system 1908 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 1904 to aid a user in viewing conference media, entering content, viewing account information, answering/initiating calls, entering/deleting data, entering and setting user IDs and passwords for device access, configuring settings, manipulating address book content and/or settings, multimode interaction, interacting with other applications 1910, and otherwise facilitating user interaction with the operating system 1908, the applications 1910, and/or other types or instances of data 1912 that can be stored at the mobile device 1900.

The applications 1910 can include the web browser application 502, the video conferencing service application 504, the VM container 506, and the virtual network layer system software 508. According to various embodiments, the applications 1910 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The data 1912 can include, for example, the media 524, one or more identifiers, and/or other applications or program modules.

The applications 1910, the data 1912, and/or portions thereof can be stored in the memory 1906 and/or in a firmware 1914, and can be executed by the processor 1904. The firmware 1914 also can store code for execution during device power up and power down operations. It can be appreciated that the firmware 1914 can be stored in a volatile or non-volatile data storage device including, but not limited to, the memory 1906 and/or a portion thereof.

The mobile device 1900 also can include an input/output ("I/O") interface 1916. The I/O interface 1916 can be configured to support the input/output of data such as location information, user information, organization information, presence status information, user IDs, passwords, and application initiation (start-up) requests. In some embodiments, the I/O interface 1916 can include a hardwire connection such as universal serial bus ("USB") port, a mini-USB port, a micro-USB port, an audio jack, a PS2 port, an Institute of Electrical and Electronics Engineers ("IEEE") 1394 ("FIREWIRE") port, a serial port, a parallel port, an Ethernet (RJ45) port, an RJ10 port, a proprietary port, combinations thereof, or the like. In some embodiments, the mobile device 1900 can be configured to synchronize with another device to transfer content to and/or from the mobile device 1900. In some embodiments, the mobile device 1900 can be configured to receive updates to one or more of the applications 1910 via the I/O interface 1916, though this is not necessarily the case. In some embodiments, the I/O interface 1916 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 1916 may be used for communications between the mobile device 1900 and a network device or local device.

The mobile device 1900 also can include a communications component 1918. The communications component 1918 can be configured to interface with the processor 1904 to facilitate wired and/or wireless communications with one or more networks such as one or more IP access networks and/or one or more circuit access networks. In some embodiments, other networks include networks that utilize non-cellular wireless technologies such as WI-FI or WIMAX. In some embodiments, the communications component 1918 includes a multimode communications subsystem for facilitating communications via the cellular network and one or more other networks.

The communications component 1918, in some embodiments, includes one or more transceivers. The one or more transceivers, if included, can be configured to communicate over the same and/or different wireless technology standards with respect to one another. For example, in some embodiments one or more of the transceivers of the communications component 1918 may be configured to communicate using GSM, CDMA ONE, CDMA2000, LTE, and various other 2G, 2.5G, 3G, 4G, and greater generation technology standards. Moreover, the communications component 1918 may facilitate communications over various channel access methods (which may or may not be used by the aforementioned standards) including, but not limited to, Time-Division Multiple Access ("TDMA"), Frequency-Division Multiple Access ("FDMA"), Wideband CDMA ("W-CDMA"), Orthogonal Frequency-Division Multiplexing ("OFDM"), Space-Division Multiple Access ("SDMA"), and the like.

In addition, the communications component 1918 may facilitate data communications using Generic Packet Radio Service ("GPRS"), Enhanced Data Rates for Global Evolution ("EDGE"), the High-Speed Packet Access ("HSPA") protocol family including High-Speed Download Packet Access ("HSDPA"), Enhanced Uplink ("EUL") or otherwise termed High-Speed Upload Packet Access ("HSUPA"), HSPA+, and various other current and future wireless data access standards. In the illustrated embodiment, the communications component 1918 can include a first transceiver ("TxRx") 1920A that can operate in a first communications mode (e.g., GSM). The communications component 1918 also can include an $N^{th}$ transceiver ("TxRx") 1920N that can operate in a second communications mode relative to the first transceiver 1920A (e.g., UMTS). While two transceivers 1920A-1920N (hereinafter collectively and/or generically referred to as "transceivers 1920") are shown in FIG. 19, it should be appreciated that less than two, two, and/or more than two transceivers 1920 can be included in the communications component 1918.

The communications component 1918 also can include an alternative transceiver ("Alt TxRx") 1922 for supporting other types and/or standards of communications. According to various contemplated embodiments, the alternative transceiver 1922 can communicate using various communications technologies such as, for example, WI-FI, WIMAX, BLUETOOTH, infrared, infrared data association ("IRDA"), near-field communications ("NFC"), ZIGBEE, other radio frequency ("RF") technologies, combinations thereof, and the like.

In some embodiments, the communications component 1918 also can facilitate reception from terrestrial radio networks, digital satellite radio networks, internet-based radio service networks, combinations thereof, and the like. The communications component 1918 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 1900 also can include one or more sensors 1924. The sensors 1924 can include temperature sensors, light sensors, air quality sensors, movement sensors, orientation sensors, noise sensors, proximity sensors, or the like. As such, it should be understood that the sensors 1924 can include, but are not limited to, accelerometers, magnetometers, gyroscopes, infrared sensors, noise sensors, microphones, combinations thereof, or the like. Additionally, audio capabilities for the mobile device 1900 may be provided by an audio I/O component 1926. The audio I/O component 1926 of the mobile device 1900 can include one or more speakers for the output of audio signals, one or more microphones for the collection and/or input of audio signals, and/or other audio input and/or output devices.

The illustrated mobile device 1900 also can include a subscriber identity module ("SIM") system 1928. The SIM system 1928 can include a universal SIM ("USIM"), a universal integrated circuit card ("UICC") and/or other identity devices. The SIM system 1928 can include and/or can be connected to or inserted into an interface such as a slot interface 1930. In some embodiments, the slot interface 1930 can be configured to accept insertion of other identity cards or modules for accessing various types of networks. Additionally, or alternatively, the slot interface 1930 can be configured to accept multiple subscriber identity cards. Because other devices and/or modules for identifying users and/or the mobile device 1900 are contemplated, it should be understood that these embodiments are illustrative, and should not be construed as being limiting in any way.

The mobile device 1900 also can include an image capture and processing system 1932 ("image system"). The image system 1932 can be configured to capture or otherwise obtain photos, videos, and/or other visual information. As such, the image system 1932 can include cameras, lenses, charge-coupled devices ("CCDs"), combinations thereof, or the like. The mobile device 1900 may also include a video system 1934. The video system 1934 can be configured to capture, process, record, modify, and/or store video content. Photos and videos obtained using the image system 1932 and the video system 1934, respectively, may be added as message content to a multimedia message service ("MMS") message, email message, and sent to another mobile device. The video and/or photo content also can be shared with other devices via various types of data transfers via wired and/or wireless communication devices as described herein.

The mobile device 1900 also can include one or more location components 1936. The location components 1936 can be configured to send and/or receive signals to determine a geographic location of the mobile device 1900. According to various embodiments, the location components 1936 can send and/or receive signals from global positioning system ("GPS") devices, assisted GPS ("A-GPS") devices, WI-FI/WIMAX and/or cellular network triangulation data, combinations thereof, and the like. The location component 1936 also can be configured to communicate with the communications component 1918 to retrieve triangulation data for determining a location of the mobile device 1900. In some embodiments, the location component 1936 can interface with cellular network nodes, telephone lines, satellites, location transmitters and/or beacons, wireless network transmitters and receivers, combinations thereof, and the like. In some embodiments, the location component 1936 can include and/or can communicate with one or more of the sensors 1924 such as a compass, an accelerometer, and/or a gyroscope to determine the orientation of the mobile device 1900. Using the location component 1936, the mobile device 1900 can generate and/or receive data to identify its geographic location, or to transmit data used by other devices to determine the location of the mobile device 1900. The location component 1936 may include multiple components for determining the location and/or orientation of the mobile device 1900.

The illustrated mobile device 1900 also can include a power source 1938. The power source 1938 can include one or more batteries, power supplies, power cells, and/or other power subsystems including alternating current ("AC") and/or direct current ("DC") power devices. The power source 1938 also can interface with an external power system or charging equipment via a power I/O component 1940. Because the mobile device 1900 can include additional and/or alternative components, the above embodiment should be understood as being illustrative of one possible operating environment for various embodiments of the concepts and technologies described herein. The described embodiment of the mobile device 1900 is illustrative, and should not be construed as being limiting in any way.

Turning now to FIG. 20, a network functions virtualization platform ("NFVP") 2000 will be described, according to an exemplary embodiment. The architecture of the NFVP 2000 can be utilized to implement various elements disclosed herein. For example, the NFVP 2000 can utilized to implement the SDN elements 112, the SDN/service controllers 114, the service orchestrator 120, the SGWs 128, the MMEs 130, the PGWs 132, the media servers 118, other elements disclosed herein, or some combination thereof.

The NFVP 2000 is a shared infrastructure that can support multiple services and network applications. The illustrated NFVP 2000 includes a hardware resource layer 2002, a virtualization/control layer 2004, and a virtual resource layer 2006 that work together to perform operations as will be described in detail herein.

The hardware resource layer 2002 provides hardware resources, which, in the illustrated embodiment, include one or more compute resources 2008, one or more memory resources 2010, and one or more other resources 2012. The compute resource(s) 2008 can include one or more hardware components that perform computations to process data, and/or to execute computer-executable instructions of one or more application programs, operating systems, and/or other software. The compute resources 2008 can include one or more central processing units ("CPUs") configured with one or more processing cores. The compute resources 2008 can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the compute resources 2008 can include one or more discrete GPUs. In some other embodiments, the compute resources 2008 can include CPU and GPU components that are configured in accordance with a co-processing CPU/GPU computing model, wherein the sequential part of an application executes on the CPU and the computationally-intensive part is accelerated by the GPU. The compute resources 2008 can include one or more system-on-chip ("SoC") components along with one or more other components, including, for example, one or more of the memory resources 2010, and/or one or more of the other resources 2012. In some embodiments, the compute resources 2008 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more Open Multimedia Application Platform ("OMAP") SoCs, available from TEXAS INSTRUMENTS of Dallas, Tex.; one or more customized versions of any of the above SoCs; and/or one or more proprietary SoCs. The compute resources 2008 can be or can include one or more hardware components architected in accordance with an advanced reduced instruction set computing ("RISC") ("ARM") architecture, available for license from ARM HOLDINGS of Cambridge, United Kingdom. Alternatively, the compute resources 2008 can be or can include one or more hardware components architected in accordance with an x86 architecture, such an architecture available from INTEL CORPORATION of Mountain View, Calif., and others. Those skilled in the art will appreciate the implementation of the compute resources 2008 can utilize various computation architectures, and as such, the compute resources 2008 should not be construed as being limited to any particular computation architecture or combination of computation architectures, including those explicitly disclosed herein.

The memory resource(s) 2010 can include one or more hardware components that perform storage operations, including temporary or permanent storage operations. In some embodiments, the memory resource(s) 2010 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resources 2008.

The other resource(s) 2012 can include any other hardware resources that can be utilized by the compute resources (s) 2008 and/or the memory resource(s) 2010 to perform operations described herein. The other resource(s) 2012 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The hardware resources operating within the hardware resources layer 2002 can be virtualized by one or more virtual machine monitors ("VMMs") 2014-2014K (also known as "hypervisors"; hereinafter "VMMs 2014") operating within the virtualization/control layer 2004 to manage one or more virtual resources that reside in the virtual resource layer 2006. The VMMs 2014 can be or can include software, firmware, and/or hardware that alone or in combination with other software, firmware, and/or hardware, manages one or more virtual resources operating within the virtual resource layer 2006.

The virtual resources operating within the virtual resource layer 2006 can include abstractions of at least a portion of the compute resources 2008, the memory resources 2010, the other resources 2012, or any combination thereof. These abstractions are referred to herein as virtual machines ("VMs"). In the illustrated embodiment, the virtual resource layer 2006 includes VMs 2016-2016N (hereinafter "VMs 2016"). Each of the VMs 2016 can execute one or more applications to perform the operations described herein.

Figure 21:
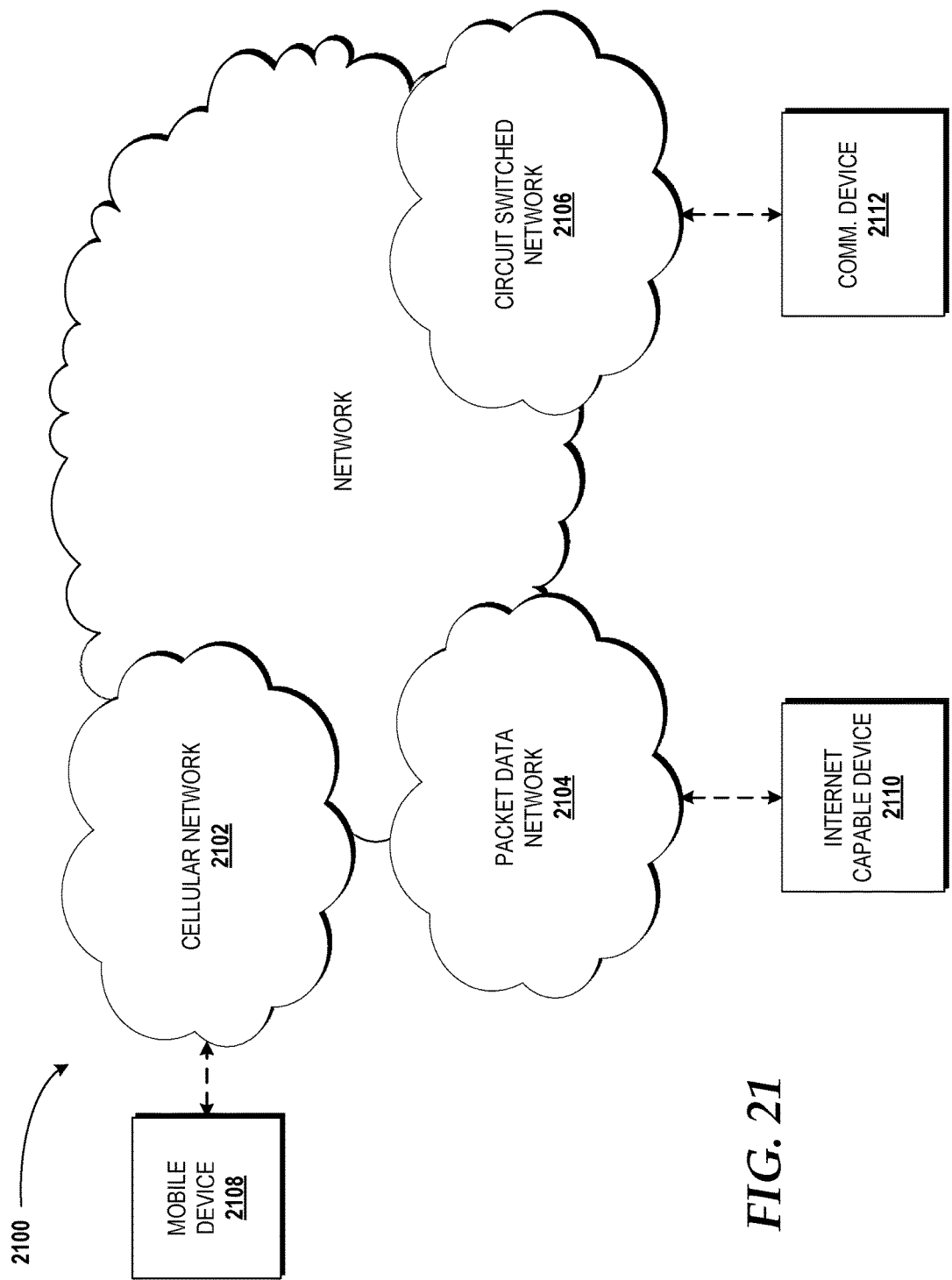
FIG. 21 is a block diagram illustrating an example network capable of implementing aspects of the embodiments presented herein.

Turning now to FIG. 21, details of a network 2100 are illustrated, according to an illustrative embodiment. The network 2100 includes a cellular network 2102, a packet data network 2104, for example, the Internet, and a circuit switched network 2106, for example, a publicly switched telephone network ("PSTN").

The cellular network 2102 can include, for example, the IP transport network 104 embodied, for example, as an LTE network as described above with reference to FIG. 1B. The cellular network 2102 includes various components such as, but not limited to, base transceiver stations ("BTSs"), NBs, eNBs (e.g., the eNBs 124), base station controllers ("BSCs"), radio network controllers ("RNCs"), mobile switching centers ("MSCs"), MMEs (e.g., the MMES 130), SGWs (e.g., the SGWs 128), PGWs (e.g., the PGWs 132), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 2102 also includes radios and nodes for receiving and transmitting voice, data, and combinations thereof to and from radio transceivers, networks, the packet data network 2104, and the circuit switched network 2106.

A mobile communications device 2108, such as, for example, the user device 108, a cellular telephone, a user equipment, a mobile terminal, a PDA, a laptop computer, a handheld computer, and combinations thereof, can be operatively connected to the cellular network 2102. The cellular network 2102 can be configured as a 2G GSM network and can provide data communications via GPRS and/or EDGE. Additionally, or alternatively, the cellular network 2102 can be configured as a 3G UMTS network and can provide data communications via the HSPA protocol family, for example, HSDPA, EUL (also referred to as HSUPA), and HSPA+. The cellular network 2102 also is compatible with 4G mobile communications standards as well as evolved and future mobile standards.

The packet data network 2104 includes various devices, for example, servers, computers, databases, and other devices in communication with one another, as is generally known. The packet data network 2104 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 2104 includes or is in communication with the Internet. The circuit switched network 2106 includes various hardware and software for providing circuit switched communications. The circuit switched network 2106 may include, or may be, what is often referred to as a plain old telephone system (POTS). The functionality of a circuit switched network 2106 or other circuit-switched network are generally known and will not be described herein in detail.

The illustrated cellular network 2103 is shown in communication with the packet data network 2104 and a circuit switched network 2106, though it should be appreciated that this is not necessarily the case. One or more Internet-capable devices 2110, for example, a PC, a laptop, a portable device, or another suitable device, can communicate with one or more cellular networks 2102, and devices connected thereto, through the packet data network 2104. It also should be appreciated that the Internet-capable device 2110 can communicate with the packet data network 2104 through the circuit switched network 2106, the cellular network 2102, and/or via other networks (not illustrated).

As illustrated, a communications device 2112, for example, a telephone, facsimile machine, modem, computer, or the like, can be in communication with the circuit switched network 2106, and therethrough to the packet data network 2104 and/or the cellular network 2102. It should be appreciated that the communications device 2112 can be an Internet-capable device, and can be substantially similar to the Internet-capable device 2110. In the specification, the network 2100 is used to refer broadly to any combination of the networks 2102, 2104, 2106. It should be appreciated that substantially all of the functionality described with reference to the network 2100 can be performed by the cellular network 2102, the packet data network 2104, and/or the circuit switched network 2106, alone or in combination with other networks, network elements, and the like.

Figure 22:
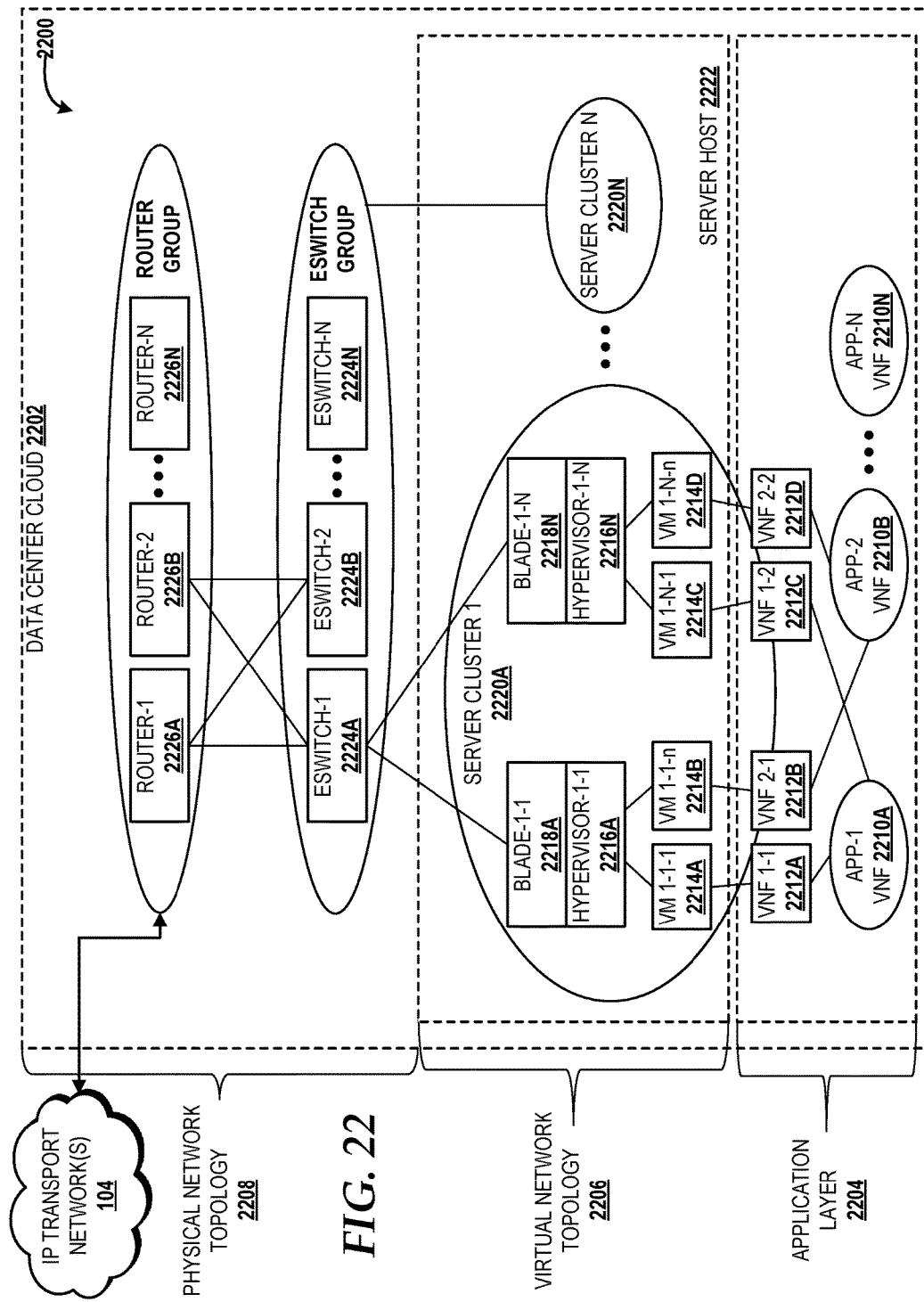
FIG. 22 is a block diagram illustrating a network topology for a data center cloud, according to an illustrative embodiment.

Turning now to FIG. 22, a network topology 2200 for a data center cloud 2202 will be described, according to an illustrative embodiment. The illustrated network topology 2200 includes three layers: an application ("APP") layer 2204, a virtual network topology layer 2206, and a physical network topology layer 2208. The APP layer 2204 can include one or more application virtual network functions ("VNFs") 2210A-2210N, each of which can be divided to one or more sub-VNFs 2212A-2212D (referred to herein collectively as sub-VNFs 2212) to be executed by one or more VMs 2214A-2214D (referred to herein collectively as VMs 2214).

The virtual network topology layer 2206 includes the VMs 2214 (e.g., the VMs 2016), one or more hypervisors 2216 (e.g., the VMMs 2014), and one or more server modules ("blades") 2218A-2218D (referred to herein collectively as blades 2218). Each blade 2218 can support one hypervisor 2216A-2216D (referred to herein collectively as hypervisors 2216) that, in turn, can manage one or more of the VMs 2214. The blades 2218 provide computing capacity to support the VMs 2214 carrying the VNFs 2212. The hypervisors 2216 provide resource management among the VMs 2214 supported thereby. A logical server cluster 2220 is created for resource allocation and reallocation purpose, which includes the blades 2218 in the same server host 2222. Each server host 2222 includes one or more of the server clusters 2220.

The physical network topology layer 2208 includes an Ethernet switch ("ESwitch") group, including one or more ESwitches 2224A-2224N (2218A-2218D (referred to herein collectively as ESwitches 2224). The physical network topology layer 2208 also includes a router group, including one or more routers 2226A-2226N (referred to herein collectively as routers 2226). The ESwitch group provides traffic switching function among the blades 2218. The router group provides connectivity for traffic routing between the data center cloud 2202 and the transport IP network(s) 104. The router group 2226 may or may not provide multiplexing functions, depending upon network design.

The virtual network topology 2206 is dynamic by nature, and as such, the VMs 2214 can be moved among the blades 2218 as needed. The physical network topology 2208 is more static, and as such, no dynamic resource allocation is involved in this layer. Through such a network topology configuration, the association among application VNFs 2210, the VM 2214 supporting the application VNFs 2210, and the blades 2218 that hosts the VM 2214 can be determined.

In the illustrated example, a first VNF is divided into two sub-VNFs, VNF 1-1 2212A and VNF 1-2 2212C, which is executed by VM 1-1-1 2214A and VM 1-N-1 2214C, respectively. The VM 1-1-1 2214A is hosted by the blade 1-1 2218A and managed by the hypervisor 1-1 2216A in the server cluster 1 2220 of the server host 2222. Traffic switching between the blade 1-1 2218A and the blade 1-N 2218N is performed via ESwitch-1 2224A. Traffic communications between the ESwitch group 2224 and the virtualized IP network(s) 114 are performed via the router group 2226. The virtual network topology 2206 is dynamic by nature due to real-time resource allocation/reallocation capability of cloud SDN, such as provided by the SDN networks 110. The association of application, VM, and blade host in this example is the VNF 1-1 2212A is executed on the VM 1-1-1 2214A hosted by the blade 1-1 2218A in the server cluster 1 2220A.

Based on the foregoing, it should be appreciated that concepts and technologies directed to service orchestration to support cloud-based, multi-party video conferencing service in a virtual overlay network environment have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

We claim:

1. A video conferencing service orchestrator comprising:
a system comprising a processor; and
memory that stores instructions that, when executed by the processor, cause the system to perform operations comprising
receiving, for a video conferencing session, a quality of service alarm indicative of a quality of service change,
determining a root cause of the quality of service change as being an IP network impairment or a mobile network impairment,
performing an action responsive to the root cause of the quality of service change, wherein the action responsive to the root cause of the quality of service change comprises a quality of service re-assignment,
determining whether the quality of service re-assignment resulted in an improvement to a quality of service associated with the video conferencing session, and
in response to determining that the quality of service re-assignment did not result in an improvement to the quality of service associated with the video conferencing session, performing a bandwidth upgrade.

2. The video conferencing service orchestrator of claim 1, wherein the operations further comprise:
determining whether the bandwidth upgrade resulted in an improvement to the quality of service associated with the video conferencing session; and
in response to determining that the bandwidth upgrade did not result in an improvement to the quality of service associated with the video conferencing session, reducing video conferencing demand on an IP network serving the video conferencing session.

3. The video conferencing service orchestrator of claim 1, wherein the operations further comprise:
determining whether the bandwidth upgrade resulted in an improvement to the quality of service associated with the video conferencing session; and
in response to determining that the bandwidth upgrade did not result in an improvement to the quality of service associated with the video conferencing session, reducing video conferencing demand on a mobile network serving the video conferencing session.

4. The video conferencing service orchestrator of claim 1, wherein determining the root cause of the quality of service change further comprises determining the root cause of the quality of service change as comprising a media server impairment; and wherein performing the action responsive to the root cause of the quality of service change comprises performing performance tuning or changing a configuration of a media server serving the video conferencing session.

5. A method comprising:
receiving, by a video conferencing service orchestrator, for a video conferencing session, a quality of service alarm indicative of a quality of service change;
determining, by the video conferencing service orchestrator, a root cause of the quality of service change as being an IP network impairment or a mobile network impairment; and
performing, by the video conferencing service orchestrator, an action responsive to the root cause of the quality of service change, wherein the action responsive to the root cause of the quality of service change comprises a quality of service re-assignment;
determining, by the video conferencing service orchestrator, whether the quality of service re-assignment resulted in an improvement to a quality of service associated with the video conferencing session; and
in response to determining that the quality of service re-assignment did not result in an improvement to the quality of service associated with the video conferencing session, performing, by the video conferencing service orchestrator, a bandwidth upgrade.

6. The method of claim 5, further comprising:
determining, by the video conferencing service orchestrator, whether the bandwidth upgrade resulted in an improvement to the quality of service associated with the video conferencing session; and
in response to determining that the bandwidth upgrade did not result in an improvement to the quality of service associated with the video conferencing session, reducing, by the video conferencing service orchestrator, video conferencing demand on an IP network serving the video conferencing session.

7. The method of claim 6, further comprising:
determining, by the video conferencing service orchestrator, whether the bandwidth upgrade resulted in an improvement to the quality of service associated with the video conferencing session; and
in response to determining that the bandwidth upgrade did not result in an improvement to the quality of service associated with the video conferencing session, reducing, by the video conferencing service orchestrator, video conferencing demand on a mobile network serving the video conferencing session.

8. The method of claim 5, wherein determining the root cause of the quality of service change further comprises determining the root cause of the quality of service change as comprising a media server impairment; and wherein performing the action responsive to the root cause of the quality of service change comprises performing performance tuning or changing a configuration of a media server serving the video conferencing session.

9. A computer-readable storage medium having instructions stored thereon that, when executed by a processor, cause the processor to perform operations comprising:
receiving, for a video conferencing session, a quality of service alarm indicative of a quality of service change;
determining a root cause of the quality of service change as being an IP network impairment;
performing an action responsive to the root cause of the quality of service change, wherein the action responsive to the root cause of the quality of service change comprises a quality of service re-assignment;
determining whether the quality of service re-assignment resulted in an improvement to a quality of service associated with the video conferencing session; and
in response to determining that the quality of service re-assignment did not result in an improvement to the quality of service associated with the video conferencing session, performing a bandwidth upgrade.

10. The computer-readable storage medium of claim 9, wherein determining the root cause of the quality of service change further comprises determining the root cause of the quality of service change as comprising a media server impairment; and
wherein performing the action responsive to the root cause of the quality of service change comprises performing performance tuning or changing a configuration of a media server serving the video conferencing session.

11. The computer-readable storage medium of claim 9, wherein the operations further comprise:
determining whether the bandwidth upgrade resulted in an improvement to the quality of service associated with the video conferencing session; and
in response to determining that the bandwidth upgrade did not result in an improvement to the quality of service associated with the video conferencing session, reducing video conferencing demand on a network serving the video conferencing session.

12. The computer-readable storage medium of claim 11, wherein the network comprises an IP network.

13. The computer-readable storage medium of claim 11, wherein the network comprises a mobile network.

* * * * *